United States Patent
Ikeda et al.

(10) Patent No.: US 12,163,642 B2
(45) Date of Patent: Dec. 10, 2024

(54) LIGHTING DEVICE

(71) Applicant: Japan Display Inc., Tokyo (JP)

(72) Inventors: Kojiro Ikeda, Tokyo (JP); Takeo Koito, Tokyo (JP); Tae Kurokawa, Tokyo (JP); Keiji Takizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/517,560

(22) Filed: Nov. 22, 2023

(65) Prior Publication Data

US 2024/0117955 A1    Apr. 11, 2024

Related U.S. Application Data

(63) Continuation of application No. PCT/JP2022/021725, filed on May 27, 2022.

(30) Foreign Application Priority Data

May 31, 2021 (JP) ................................ 2021-091444

(51) Int. Cl.
  *G02F 1/29* (2006.01)
  *F21V 8/00* (2006.01)
  *F21V 14/00* (2018.01)

(52) U.S. Cl.
  CPC ............ *F21V 14/003* (2013.01); *G02B 6/005* (2013.01); *G02F 1/29* (2013.01)

(58) Field of Classification Search
  CPC .......... F21V 14/003; G02F 1/29; G02B 6/005
  See application file for complete search history.

(56) References Cited

U.S. PATENT DOCUMENTS

| | | | | |
|---|---|---|---|---|
| 8,717,520 | B2 * | 5/2014 | Hamagishi | G02F 1/134309 359/464 |
| 9,335,580 | B2 * | 5/2016 | Tamaki | G02F 1/133514 |
| 2005/0243237 | A1 | 11/2005 | Sasuga | |
| 2010/0149444 | A1 | 6/2010 | Hikmet et al. | |
| 2012/0268358 | A1 * | 10/2012 | Maede | G02F 1/134363 345/92 |
| 2021/0141266 | A1 * | 5/2021 | Takimoto | G02F 1/133512 |

FOREIGN PATENT DOCUMENTS

| | | |
|---|---|---|
| JP | 2005317879 A | 11/2005 |
| JP | 2010230887 A | 10/2010 |
| JP | 2014160277 A | 9/2014 |

* cited by examiner

*Primary Examiner* — Leah Simone Macchiarolo
(74) *Attorney, Agent, or Firm* — K&L Gates LLP

(57) ABSTRACT

A lighting device includes a light emitting module and an optical element including first and second liquid crystal cells. Each of the first and second liquid crystal cells includes first and second transparent electrodes extending in a first direction and third and fourth transparent electrodes extending in a second direction. The light emitting module includes a light source, a light guide plate including an end surface into which light emitted from the light source is incident and a first surface from which the light incident into the end surface is emitted, and a prism sheet disposed opposite to the first surface. The second substrate of the first liquid crystal cell and the first substrate of the second liquid crystal cell are adjacent to each other. The first surface includes a plurality of first grooves extending in a third direction intersecting the first direction and the second direction.

15 Claims, 18 Drawing Sheets after correction before correction before correction after correction fourth direction (y-axis)
second direction
third direction (x-axis)
first direction

LIGHTING DEVICE

CROSS-REFERENCE TO RELATED APPLICATIONS

This application is a Continuation of International Patent Application No. PCT/JP2022/021725, filed on May 27, 2022, which claims the benefit of priority to Japanese Patent Application No. 2021-091444, filed on May 31, 2021, the entire contents of which are incorporated herein by reference.

FIELD

An embodiment of the present invention relates to a lighting device.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication No. 2005-317879, 2010-230887, or 2014-160277). For example, the lighting devices disclosed in the Japanese laid-open patent publications Nos. 2005-317879 and 2010-230877 use a liquid crystal lens to distribute light from a light source in a circular shape. Further, the beam shaping device disclosed in the Japanese laid-open patent publication No. 2014-160277 changes the distribution shape of light by changing patterns of an electrode applied to a liquid crystal.

SUMMARY

A lighting device according to an embodiment of the present invention includes a light emitting module and an optical element transmitting light emitted from the light emitting module. In the optical element, a first liquid crystal cell and a second liquid crystal cell are stacked. Each of the first liquid crystal cell and the second liquid crystal cell includes a first substrate on which a first transparent electrode and a second transparent electrode are alternately arranged in a first direction and a second substrate on which a third transparent electrode and a fourth transparent electrode are alternately arranged in a second direction intersecting the first direction. The light emitting module includes a light source, a light guide plate including an end surface into which light emitted from the light source is incident and a first surface from which the light incident into the end surface is emitted, and a prism sheet disposed opposite to the first surface. The second substrate of the first liquid crystal cell and the first substrate of the second liquid crystal cell are adjacent to each other The first surface includes a plurality of first grooves extending in a third direction intersecting the first direction and the second direction.

A lighting device according to an embodiment of the present invention includes a light emitting module and an optical element transmitting light emitted from the light emitting module. In the optical element, a first liquid crystal cell and a second liquid crystal cell are stacked. Each of the first liquid crystal cell and the second liquid crystal cell includes a first substrate on which a first transparent electrode and a second transparent electrode are alternately arranged in a first direction and a second substrate on which a third transparent electrode and a fourth transparent electrode are alternately arranged in a second direction intersecting the first direction. The light emitting module includes a light source and a reflector arranged around the light source and reflecting light emitted from the light source. The second substrate of the first liquid crystal cell and the first substrate of the second liquid crystal cell are adjacent to each other.

DESCRIPTION OF EMBODIMENTS

Figure 1A:
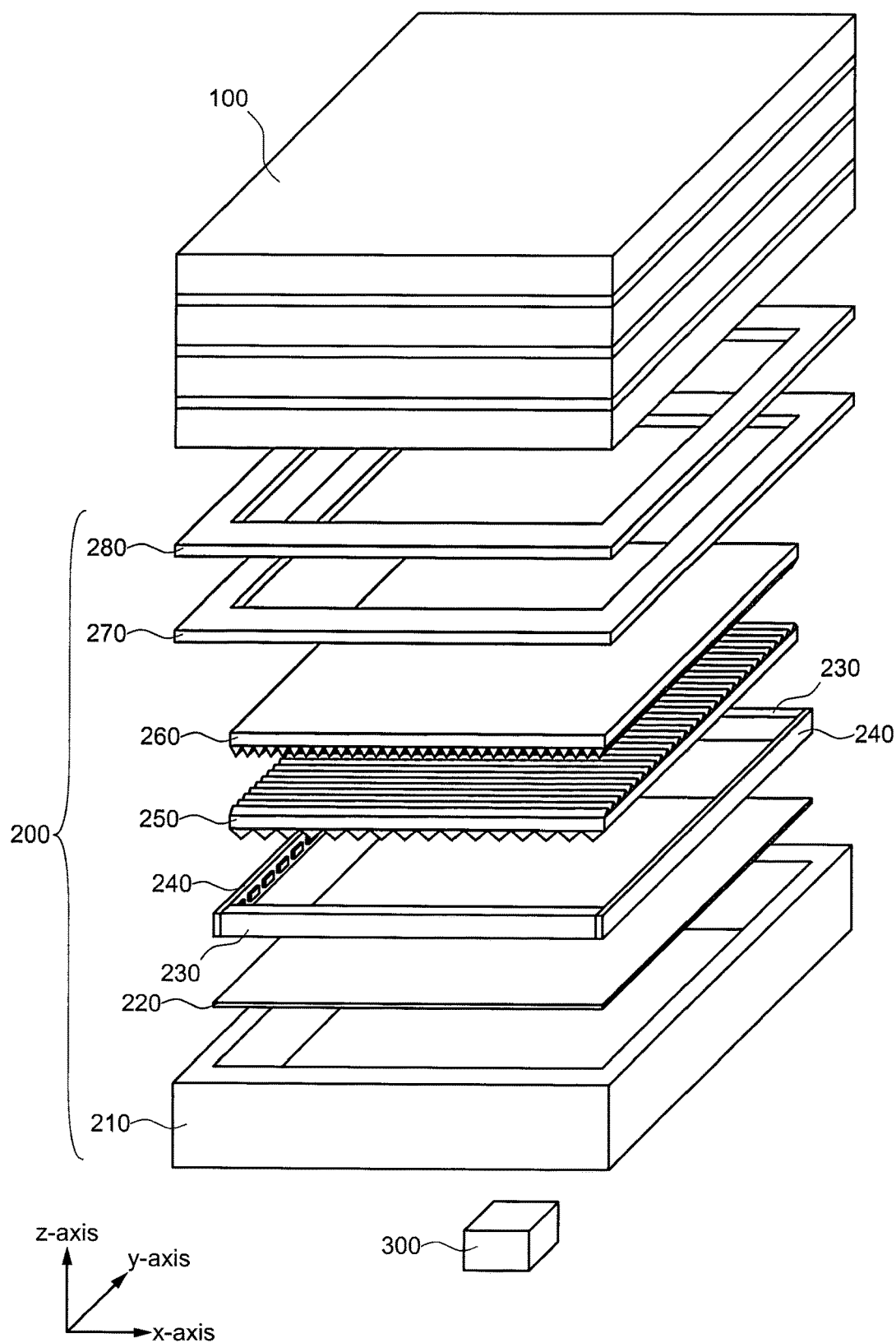
FIG. 1A is a schematic exploded perspective view of a lighting device according to an embodiment of the present invention.

A shape of a light distribution of light that passes through a liquid crystal lens also changes depending on a configuration of a light emitting module including a light source. Therefore, there has been demand for a lighting device including an optical element that is compatible with any light emitting module.

In view of the above problem, an embodiment of the present invention can provide a lighting device that is able to correct a shape of light distribution according to a configuration of a light emitting module.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

First Embodiment

A lighting device 10 according to an embodiment of the present invention is described with reference to FIGS. 1A to 5.

[1. Configuration of Lighting Device 10]

FIG. 1A is a schematic exploded perspective view of a lighting device 10 according to an embodiment of the present invention. As shown in FIG. 1A, the lighting device 10 includes an optical element 100, a light emitting module 200, and a control unit 300. The light emitting module 200 includes a metal frame 210, a reflective sheet 220, a resin frame 230, a light source substrate 240, a light guide plate 250, a prism sheet 260, a spacer 270, and a light-shielding double-sided tape 280. The reflective sheet 220, the resin frame 230, the light source substrate 240, the light guide plate 250, and the prism sheet 260 are arranged in a space surrounded by the metal frame 210 and the spacer 270. The spacer 270 is provided with an opening that transmits light. Further, the light-shielding double-sided tape 280 is provided on the spacer 270, and the spacer 270 and the optical element 100 are bonded to each other via the light-shielding double-sided tape 280. The control unit 300 may be provided outside the light emitting module 200 or may be provided within the light emitting module 200.

Figure 1B:
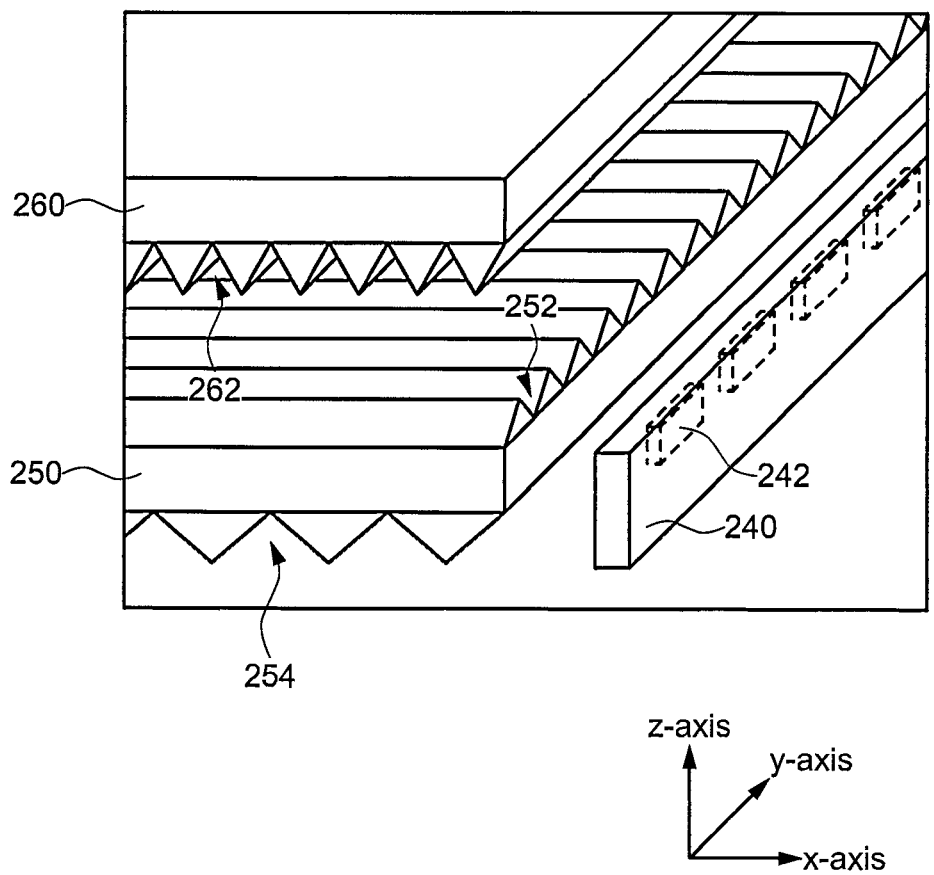
FIG. 1B is a partially enlarged view illustrating the light emitting module of a lighting device according to an embodiment of the present invention.

FIG. 1B is a partially enlarged view illustrating the light emitting module 200 of the lighting device 10 according to an embodiment of the present invention. A first surface of the light guide plate 250 is provided with a plurality of first grooves 252 extending in an x-axis direction. A plurality of second grooves 254 extending in a y-axis direction are formed on a second surface of the light guide plate 250 opposite to the first surface. The cross-sectional shape of each of the first groove 252 and the second groove 254 is an isosceles triangle. In other words, each of the first surface and the second surface of the light guide plate 250 is provided with a convex portion having an isosceles triangular cross-sectional shape. The apex angle of the convex portion on the first surface is, for example, 98 degrees, and the apex angle of the convex portion on the second surface is, for example, 177 degrees. However, the angle of the apex angle is not limited thereto. Further, the cross-sectional shape of the convex portion is not limited to an isosceles triangle. The cross-sectional shape of the convex portion may be a semicircular shape.

The prism sheet 260 is arranged to face the first surface of the light guide plate 250. Further, the reflective sheet 220 is arranged to face the second surface of the light guide plate 250. Furthermore, the light source substrate 240 is arranged at an end surface of the light guide plate 250. LED (Light Emitting Diode) elements 242 are mounted on the light source substrate 240 as a light source. The light emitted from the LED elements 242 enters the end surface of the light guide plate 250, is reflected by the reflective sheet 220 and refracted by the light guide plate 250, and then exits from the first surface of the light guide plate 250.

A plurality of grooves 262 extending in the y-axis direction are provided on a surface of the prism sheet 260 that faces the first surface of the light guide plate 250. The cross-sectional shape of the groove 262 is an isosceles triangle. In other words, a triangular prism extending in the y-axis direction is provided on the surface of the prism sheet 260. The apex angle of the isosceles triangle in the cross-sectional shape of the triangular prism is, for example, 68 degrees. The light emitted from the first surface of the light guide plate 250 enters from the surface of the prism sheet 260 on which the triangular prism is formed, and is emitted from the opposite surface as collimated light.

The light emitting module 200 is a so-called edge light. That is, the light emitting module 200 can convert the light emitted from the LED elements 242 into collimated light, and can irradiate the optical element 100 with the collimated light. In addition, an aspect of the light distribution of the collimated light can be adjusted as appropriate by changing the groove shape or a combination of the light guide plate and the prism sheet. Specifically, it is also possible to adopt an aspect in which light is irradiated in a planar manner over the entire light output area defined by the light-shielding double-sided tape 280. Further, it is also possible to adopt an aspect in which the light is irradiated only from the center of the light output area. Such a light emitting module allows the light source to be made thinner.

Figure 1C:
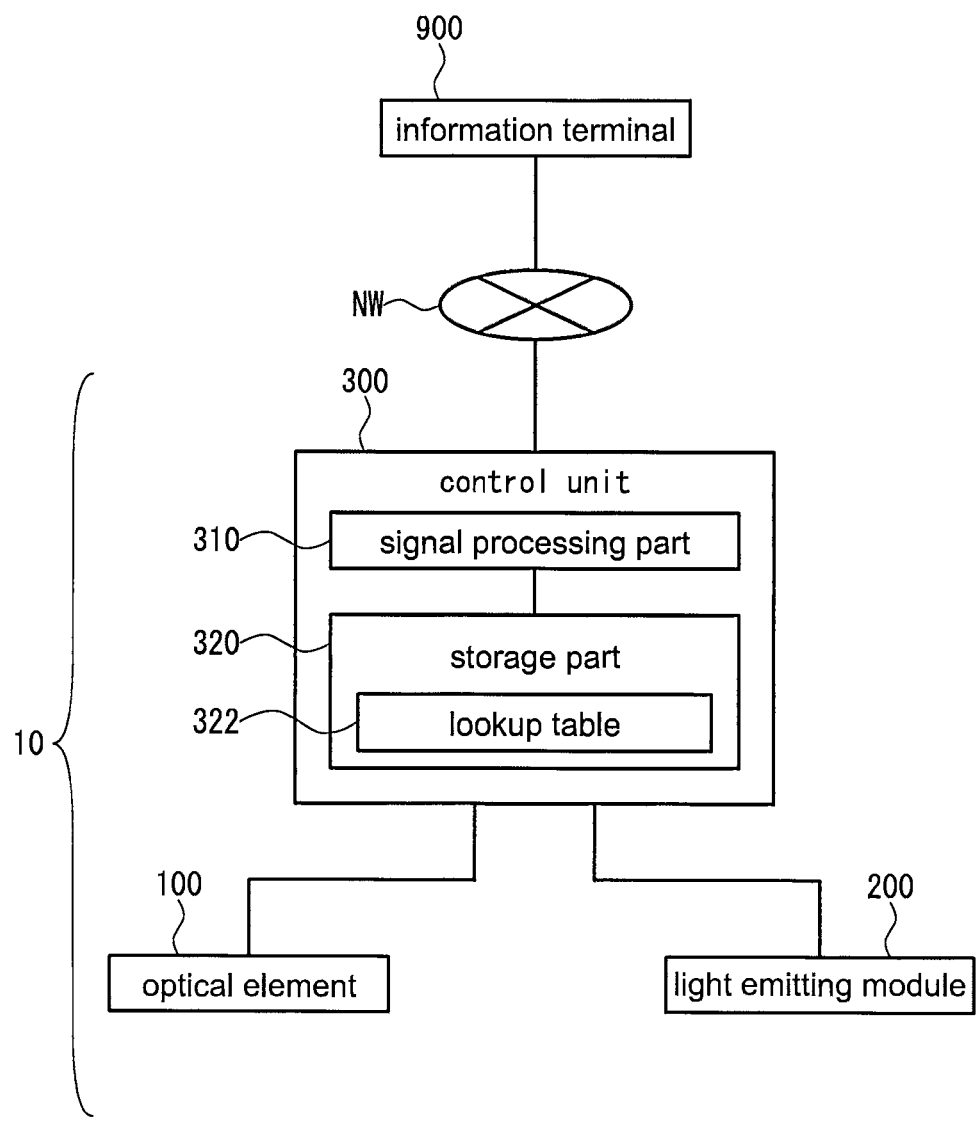
FIG. 1C is a block diagram illustrating a lighting device according to an embodiment of the present invention.

FIG. 1C is a block diagram illustrating the lighting device 10 according to an embodiment of the present invention. As shown in FIG. 1C, in the lighting device 10, the control unit 300 is electrically connected to the optical element 100 and the light emitting module 200, and can control the optical element 100 and the light emitting module 200. Further, the control unit 300 includes a signal processing part 310 and a storage part 320.

The signal processing part 310 is a computer that can perform arithmetic processing using data or information. The signal processing part 310 includes, for example, a central processing unit (CPU), a micro processing unit (MPU), or a random access memory (RAM). Specifically, the signal processing part 310 can execute a predetermined function by reading a program.

The storage part 320 is a storage that can store data or information. For example, a hard disk drive (HDD), a solid state drive (SSD), a read only memory (ROM), a random access memory (RAM), or a flash memory etc. can be used for the storage part 320. Further, the storage part 320 includes a lookup table 322 in which values of potentials to be supplied to the optical element 100 are stored in order to correct the shape of the light distribution of the light emitted from the light emitting module 200. In addition, the correction of the shape of the light distribution is described later.

The control unit 300 can be communicatively connected to a user's information terminal 900 via a network NW. The network NW may be wired or wireless. For example, although the network NW is a LAN (Local Area Network) or the Internet, the network NW is not limited thereto. Further, although the information terminal 900 is, for example, a mobile phone, a smartphone, a tablet, or a personal computer, the information terminal 900 is not limited thereto.

The lighting device 10 can be controlled by operating the information terminal 900. That is, when the lighting device 10 receives a request signal from the information terminal 900, the signal processing part 310 of the control part 300 controls the optical element 100 or the light emitting module 200 based on the received request signal. The request signal is, for example, a signal related to an adjustment of the brightness of the lighting device 10 (brightness of the light emitting module 200) or a signal related to the shape of the light distribution of the light emitted from the lighting device 10. When the signal related to adjusting the brightness of the lighting device 10 is received as a request signal, the signal processing part 310 adjusts the current supplied to the LED elements 242. When the signal related to the shape of the light distribution of the light emitted from the lighting device 10 is received as a request signal, the signal processing part 310 controls the potential supplied to the optical element 100.

In the lighting device 10, the light emitted from the light emitting module 200 is emitted to the outside via the optical element 100. Therefore, the optical element 100 is described below.

[2. Configuration of Optical Element 100]

Figure 2A:
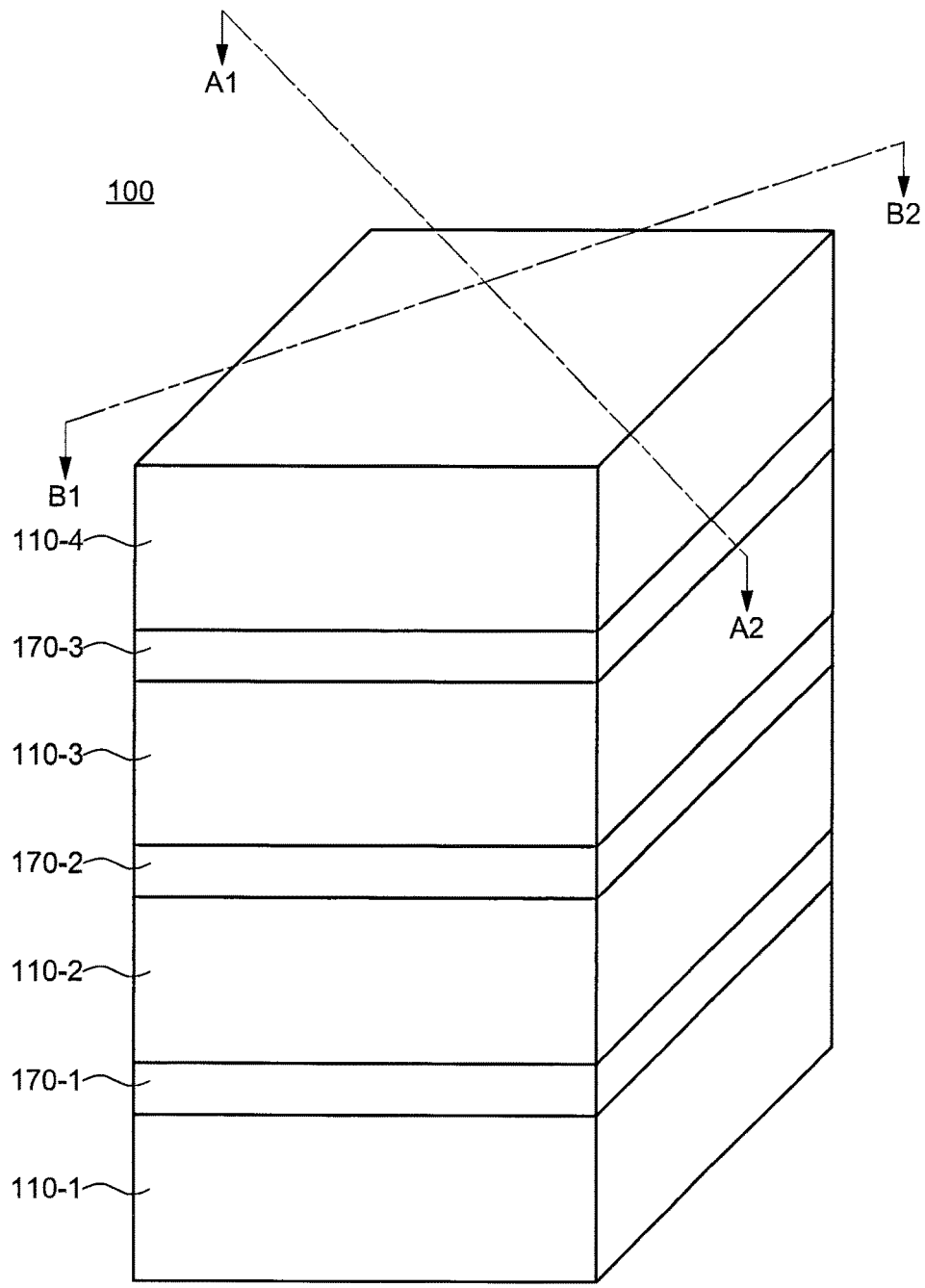
FIG. 2A is a schematic perspective view of an optical element of a lighting device according to an embodiment of the present invention.

FIG. 2A is a schematic perspective view of the optical element 100 of the lighting device 10 according to an embodiment of the present invention. As shown in FIG. 2A, the optical element 100 includes a first liquid crystal cell 110-1, a second liquid crystal cell 110-2, a third liquid crystal cell 110-3, and a fourth liquid crystal cell 110-4. The first liquid crystal cell 110-1, the second liquid crystal cell 110-2, the third liquid crystal cell 110-3, and the fourth liquid crystal cell 110-4 are stacked in a z-axis direction. The second liquid crystal cell 110-2 is provided on the first liquid crystal cell 110-1. The third liquid crystal cell 110-3 is provided on the second liquid crystal cell 110-2. The fourth liquid crystal cell 110-4 is provided on the third liquid crystal cell 110-3. The light emitted from the light emitting module 200 passes through the first liquid crystal cell 110-1, the second liquid crystal cell 110-2, the third liquid crystal cell 110-3, and the fourth liquid crystal cell 110-4 in order.

A first optical elastic resin layer 170-1 adheres and fixes the first liquid crystal cell 110-1 and the second liquid crystal cell 110-2. A second optical elastic resin layer 170-2 adheres and fixes the second liquid crystal cell 110-2 and the third liquid crystal cell 110-3. A third optical elastic resin layer 170-3 adheres and fixes the third liquid crystal cell 110-3 and the fourth liquid crystal cell 110-4. An adhesive containing a transparent acrylic resin or epoxy resin can be used for each of the first optical elastic resin layer 170-1, the second optical elastic resin layer 170-2, and the third optical elastic resin layer 170-3.

Figure 2B:
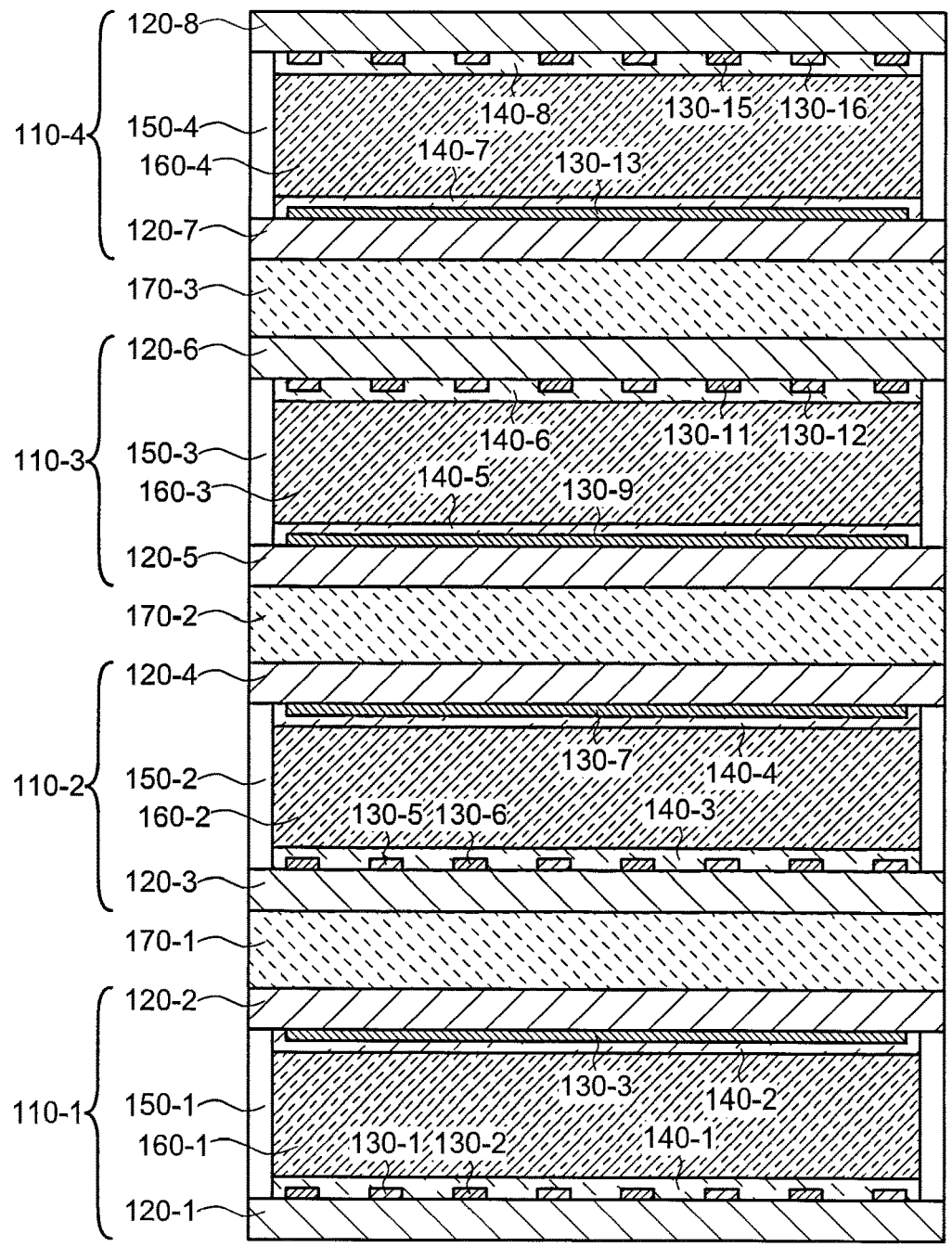
FIG. 2B is a schematic cross-sectional view of an optical element of a lighting device according to an embodiment of the present invention.
Figure 2C:
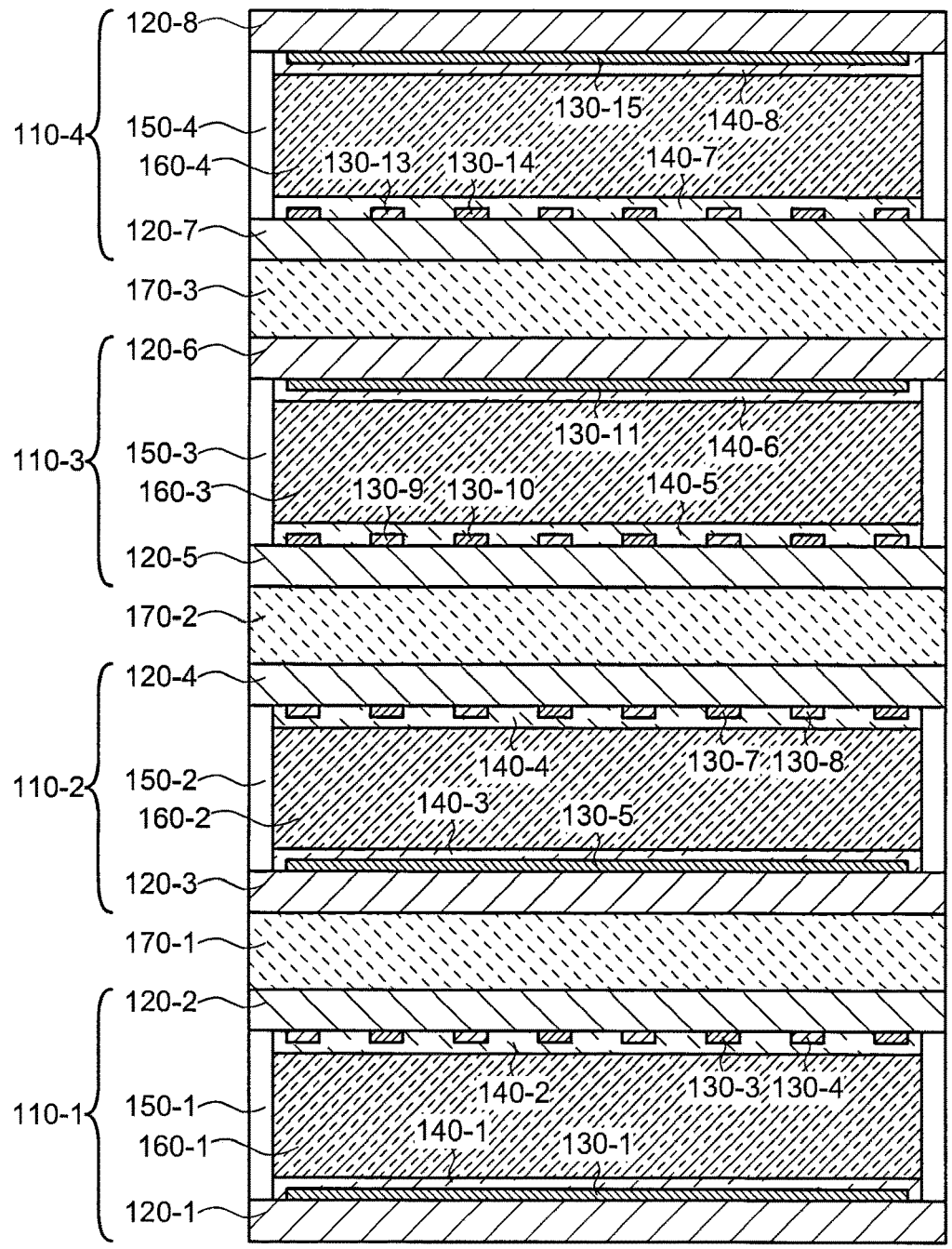
FIG. 2C is a schematic cross-sectional view of an optical element of a lighting device according to an embodiment of the present invention.

FIGS. 2B and 2C are schematic cross-sectional views of the optical element 100 of the lighting device 10 according to an embodiment of the present invention. Specifically, FIG. 2B is a schematic cross-sectional view of the optical element 100 cut along a line A1-A2 shown in FIG. 2A, and FIG. 2C is a schematic cross-sectional view of the optical element 100 cut along a line B1-B2 shown in FIG. 2A. In the following description, for convenience, a direction parallel to the line A1-A2 is referred to as a first direction, and a direction parallel to the line B1-B2 is referred to as a second direction. The first direction and the second direction intersect each other at 90 degrees, and each of the first direction and the second direction intersects the x-axis direction and the y-axis direction at 45 degrees or 135 degrees. In the following description, for convenience, the x-axis direction and the y-axis direction are referred to as the third direction and the fourth direction, respectively. That is, the third direction and the fourth direction intersect each other at 90 degrees.

Although the angle between the first direction and the second direction is not limited to 90 degrees, the angle may be approximately 90 degrees. The "approximately 90 degrees" is, for example, 90±10 degrees. Further, although each of the angle between the first direction and the third direction or the fourth direction and the angle between the second direction and the third direction or the fourth direction are limited to 45 degrees or 135 degrees, each of the angles may be approximately 45 degrees or approximately 135 degrees. The "approximately 45 degrees" is, for example, 45±10 degrees, and the "approximately 135 degrees" is, for example, 135±10 degrees.

The first liquid crystal cell 110-1 includes a first substrate 120-1 on which a first transparent electrode 130-1 and a second transparent electrode 130-2 are formed and a second substrate 120-2 on which a third transparent electrode 130-3 and a fourth transparent electrode 130-4 are formed. A first alignment film 140-1 is formed on the first substrate 120-1 in order to cover the first transparent electrode 130-1 and the second transparent electrode 130-2. Further, a second alignment film 140-2 is formed on the second substrate 120-2 in order to cover the third transparent electrode 130-3 and the fourth transparent electrode 130-4. The first substrate 120-1 and the second substrate 120-2 are arranged so that the first transparent electrode 130-1 and the second transparent electrode 130-2 on the first substrate 120-1 face the third transparent electrode 130-3 and the fourth transparent electrode 130-4 on the second substrate 120-2. Further, a first sealing member 150-1 is formed in the peripheral region of each of the first substrate 120-1 and the second substrate 120-2. That is, the first substrate 120-1 and the second substrate 120-2 are bonded to each other via the first sealing member 150-1. Furthermore, a liquid crystal is sealed in a space surrounded by the first substrate 120-1 (more specifically, the first alignment film 140-1), the second substrate 120-2 (more specifically, the second alignment film 140-2), and the first sealing member 150-1 to form a first liquid crystal layer 160-1.

The second liquid crystal cell 110-2 includes a third substrate 120-3 on which a fifth transparent electrode 130-5 and a sixth transparent electrode 130-6 are formed and a fourth substrate 120-4 on which a seventh transparent electrode 130-7 and an eighth transparent electrode 130-8 are formed. A third alignment film 140-3 is formed on the third substrate 120-3 in order to cover the third transparent electrode 130-3 and the fourth transparent electrode 130-4. Further, a fourth alignment film 140-4 is formed on the fourth substrate 120-4 in order to cover the seventh transparent electrode 130-7 and the eighth transparent electrode 130-8. The third substrate 120-3 and the fourth substrate 120-4 are arranged so that the fifth transparent electrode 130-5 and the sixth transparent electrode 130-6 on the third substrate 120-3 face the seventh transparent electrode 130-7 and the eighth transparent electrode 130-8 on the fourth substrate 120-2. Further, a second sealing member 150-2 is formed in the peripheral region of each of the third substrate 120-3 and the fourth substrate 120-4. That is, the third substrate 120-3 and the fourth substrate 120-4 are bonded to each other via the second sealing member 150-2. Furthermore, a liquid crystal is sealed in a space surrounded by the third substrate 120-3 (more specifically, the third alignment film 140-3), the fourth substrate 120-4 (more specifically, the fourth alignment film 140-4), and the second sealing member 150-2 to form a second liquid crystal layer 160-2.

The third liquid crystal cell 110-3 includes a fifth substrate 120-5 on which a ninth transparent electrode 130-9 and a tenth transparent electrode 130-10 are formed and a sixth substrate 120-6 on which an eleventh transparent electrode 130-11 and a twelfth transparent electrode 130-12 are formed. A fifth alignment film 140-5 is formed on the fifth substrate 120-5 in order to cover the ninth transparent electrode 130-9 and the tenth transparent electrode 130-10. Further, a sixth alignment film 140-6 is formed on the sixth substrate 120-6 in order to cover the eleventh transparent electrode 130-11 and the twelfth transparent electrode 130-12. The fifth substrate 120-5 and the sixth substrate 120-6 are arranged so that the ninth transparent electrode 130-9 and the tenth transparent electrode 130-10 on the fifth substrate 120-5 face the eleventh transparent electrode 130-11 and the twelfth transparent electrode 130-12 on the sixth substrate 120-6. Further, a third sealing member 150-3 is formed in the peripheral region of each of the fifth substrate 120-5 and the sixth substrate 120-6. That is, the fifth substrate 120-5 and the sixth substrate 120-6 are bonded to each other via the third sealing member 150-3. Furthermore, a liquid crystal is sealed in a space surrounded by the fifth substrate 120-5 (more specifically, the fifth alignment film 140-5), the sixth substrate 120-6 (more specifically, the sixth alignment film 140-4), and the third sealing member 150-3 to form a third liquid crystal layer 160-3.

The fourth liquid crystal cell 110-4 includes a seventh substrate 120-7 on which a thirteenth transparent electrode 130-13 and a fourteenth transparent electrode 130-14 are formed and an eighth substrate 120-8 on which a fifteenth transparent electrode 130-15 and a sixteenth transparent electrode 130-16 are formed. A seventh alignment film 140-7 is formed on the seventh substrate 120-7 in order to cover the thirteenth transparent electrode 130-13 and the fourteenth transparent electrode 130-14. Further, an eighth alignment film 140-8 is formed on the eighth substrate 120-8 in order to cover the fifteenth transparent electrode 130-15 and the sixteenth transparent electrode 130-16. The seventh substrate 120-7 and the eighth substrate 120-8 are arranged so that the thirteenth transparent electrode 130-13 and the fourteenth transparent electrode 130-14 on the seventh substrate 120-7 face the fifteenth transparent electrode 130-15 and the sixteenth transparent electrode 130-16 on the eighth substrate 120-8. Further, a fourth sealing member 150-4 is formed in the peripheral region of each of the seventh substrate 120-7 and the eighth substrate 120-8. That is, the seventh substrate 120-7 and the eighth substrate 120-8 are bonded to each other via the fourth sealing member 150-4. Furthermore, a liquid crystal is sealed in a space surrounded by the seventh substrate 120-7 (more specifically, the seventh alignment film 140-7), the eighth substrate 120-8 (more specifically, the eighth alignment film 140-8), and the fourth sealing member 150-4 to form a fourth liquid crystal layer 160-4.

The first liquid crystal cell 110-1, the second liquid crystal cell 110-2, the third liquid crystal cell 110-3, and the fourth liquid crystal cell 110-4 have the same basic configuration. However, the arrangements of the transparent electrodes 130 are different.

In the first liquid crystal cell 110-1, the first transparent electrode 130-1 and the second transparent electrode 130-2 extend in the second direction, and the third transparent electrode 130-3 and the fourth transparent electrode 130-4 extend in the first direction. Further, the first transparent electrode 130-1 and the second transparent electrode 130-2 are arranged alternately in a comb-like shape in the first direction, and the third transparent electrode 130-3 and the fourth transparent electrode 130-4 are alternately arranged in a comb-like shape in the second direction. In a plan view, although an extending direction (corresponding to the second direction) of the first transparent electrode 130-1 and the second transparent electrode 130-2 is orthogonal to an extending direction (corresponding to the first direction) of the third transparent electrode 130-3 and the fourth transparent electrode 130-4, the extending directions may be slightly shifted and intersect each other (approximately 90 degrees). In the second liquid crystal cell 110-2, the fifth transparent electrode 130-4 and the sixth transparent electrode 130-6 extend in the second direction, and the seventh transparent electrode 130-7 and the eighth transparent electrode 130-8 extend in the first direction. Further, the fifth transparent electrode 130-5 and the sixth transparent electrode 130-6 are arranged alternately in a comb-like shape in the first direction, and the seventh transparent electrode 130-7 and the eighth transparent electrode 130-8 are arranged alternately in a comb-teeth shape in the second direction. In the plan view, although an extending direction (corresponding to the second direction) of the fifth transparent electrode 130-5 and the sixth transparent electrode 130-6 is orthogonal to an extending direction (corresponding to the first direction) of the seventh transparent electrode 130-7 and the eighth transparent electrode 130-8, the extending directions may be slightly shifted and intersect each other (approximately 90 degrees).

In the third liquid crystal cell 110-3, the ninth transparent electrode 130-9 and the tenth transparent electrode 130-10 extend in the first direction, and the eleventh transparent electrode 130-11 and the twelfth transparent electrode 130-12 extend in the second direction. Further, the ninth transparent electrode 130-9 and the tenth transparent electrode 130-10 are arranged alternately in a comb-like shape in the second direction, and the eleventh transparent electrode 130-11 and the twelfth transparent electrode 130-12 are alternately arranged in a comb-like shape in the first direction. In the plan view, although an extending direction (corresponding to the first direction) of the ninth transparent electrode 130-9 and the tenth transparent electrode 130-10 is orthogonal to an extending direction of the eleventh transparent electrode 130-11 and the twelfth transparent electrode 130-1, the extending directions may be slightly shifted and intersect each other (approximately 90 degrees).

In the fourth liquid crystal cell 110-4, the thirteenth transparent electrode 130-13 and the fourteenth transparent electrode 130-14 extend in the first direction, and the fifteenth transparent electrode 130-15 and the sixteenth transparent electrode 130-16 extend in the second direction. Further, the thirteenth transparent electrode 130-13 and the fourteenth transparent electrode 130-14 are arranged alternately in a comb-like shape in the second direction, and the fifteenth transparent electrode 130-15 and the sixteenth transparent electrode 130-16 are alternately arranged in a comb-like shape in the first direction. In the plan view, although an extending direction (corresponding to the first direction) of the thirteenth transparent electrode 130-13 and the fourteenth transparent electrode 130-14 is orthogonal to an extending direction of the fifteenth transparent electrode 130-15 and the sixteenth transparent electrode 130-16, the extending directions may be slightly shifted and intersect each other (approximately 90 degrees).

In the plan view, the first transparent electrode 130-1, the fifth transparent electrode 130-5, the eleventh transparent electrode 130-11, and the fifteenth transparent electrode 130-15 overlap each other so that the extending direction (corresponding to the second direction) of their electrodes 130 almost match. The same configuration applies to the other transparent electrodes 130. However, the first liquid crystal cell 110-1 to the fourth liquid crystal cell 110-4 may be arranged so that the first transparent electrode 130-1, the fifth transparent electrode 130-5, the eleventh transparent electrode 130-11, and the fifteenth transparent electrode 130-15 overlap each other with a slight shift.

For example, a rigid substrate having light-transmitting properties such as a glass substrate, a quartz substrate, or a sapphire substrate is used as each of the first substrate 120-1 to the eighth substrate 120-8. Further, a flexible substrate having light-transmitting properties such as a polyimide resin substrate, an acrylic resin substrate, a siloxane resin substrate, or a fluorine resin substrate can also be used as each of the first substrate 120-1 to the eighth substrate 120-8.

Each of the first transparent electrode 130-1 to the sixteenth transparent electrode 130-16 functions as an electrode for forming an electric field in the liquid crystal layer 160. For example, a transparent conductive material such as indium tin oxide (ITO) or indium zinc oxide (IZO) is used for each of the first transparent electrode 130-1 to the sixteenth transparent electrode 130-16.

Each of the first liquid crystal layer 160-1 to the fourth liquid crystal layer 160-4 can refract transmitted light or change the polarization state of transmitted light according to the alignment state of the liquid crystal molecules. For example, nematic liquid crystal can be used as the liquid crystal of each of the first liquid crystal layer 160-1 to the fourth liquid crystal layer 160-4. Although a positive liquid crystal is adopted in the present embodiment, it is also possible to adopt a configuration of a negative liquid crystal by changing the initial alignment direction of the liquid crystal molecules. Further, the liquid crystal preferably contains a chiral agent that imparts twist to the liquid crystal molecules.

Each of the first alignment film 140-1 to the eighth alignment film 140-8 aligns the liquid crystal molecules in the liquid crystal layer 113 in a predetermined direction. For example, a polyimide resin or the like can be used for each of the first alignment film 140-1 to the eighth alignment film 140-8. In addition, each of the first alignment film 140-1 to the eighth alignment film 140-8 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the first sealing member 150-1 to the fourth sealing member 150-4. The adhesive material may be of an ultraviolet curable type or a heat curable type.

The optical element 100 includes at least two liquid crystal cells (for example, the first liquid crystal cell 110-1 and the second liquid crystal cell 110-2), so that the light distribution of unpolarized light can be controlled. Therefore, it is not necessary to provide a pair of polarizing plates on the outer surface of each of the first substrate 120-1 of the first liquid crystal cell 110-1 and the eighth substrate 120-8 of the fourth liquid crystal cell 110-4.

[3. Control of Light Distribution by Optical Element 100]

Figure 3A:
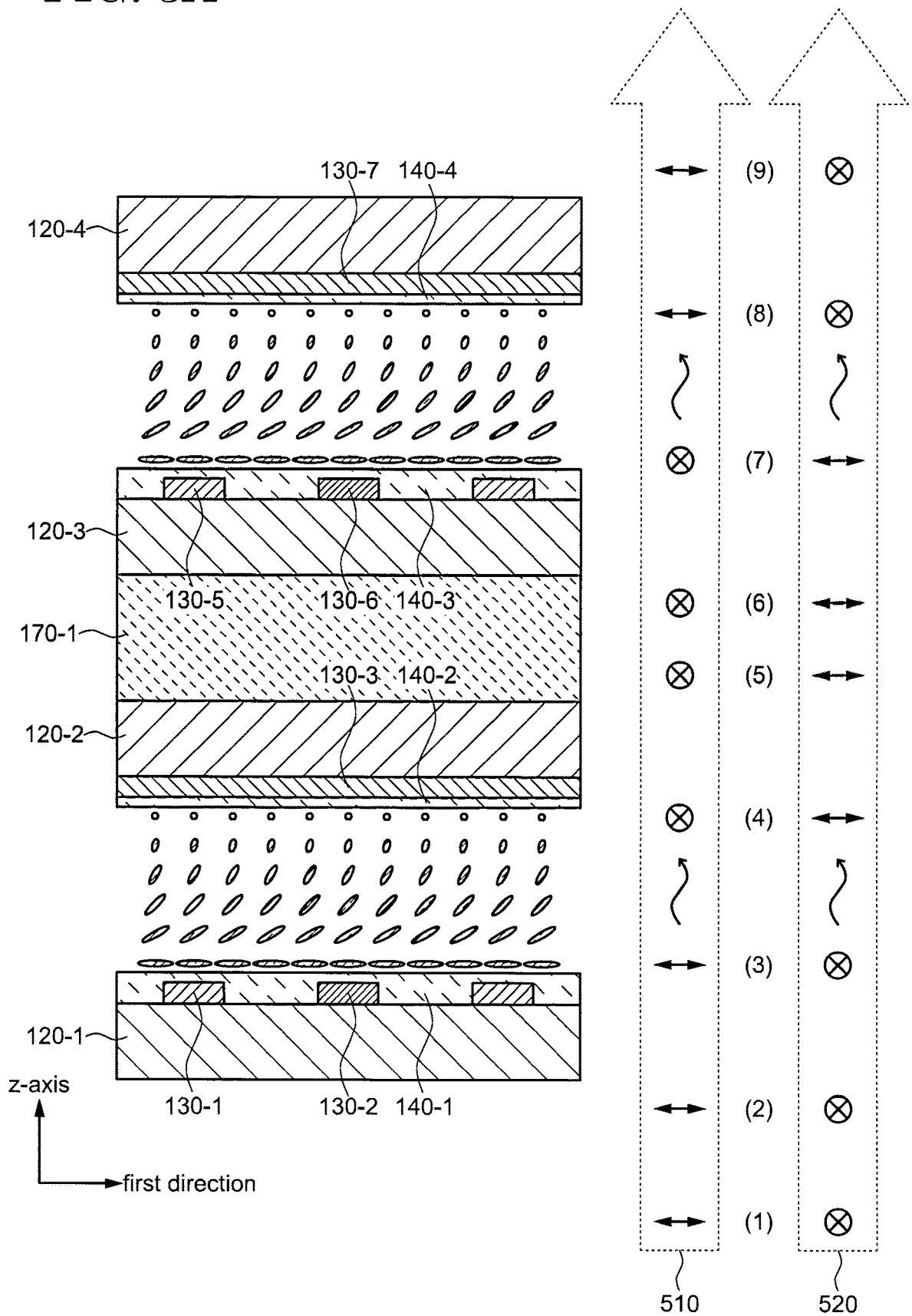
FIG. 3A is a schematic cross-sectional view illustrating control of a light distribution by an optical element of a lighting device according to an embodiment of the present invention.
Figure 3B:
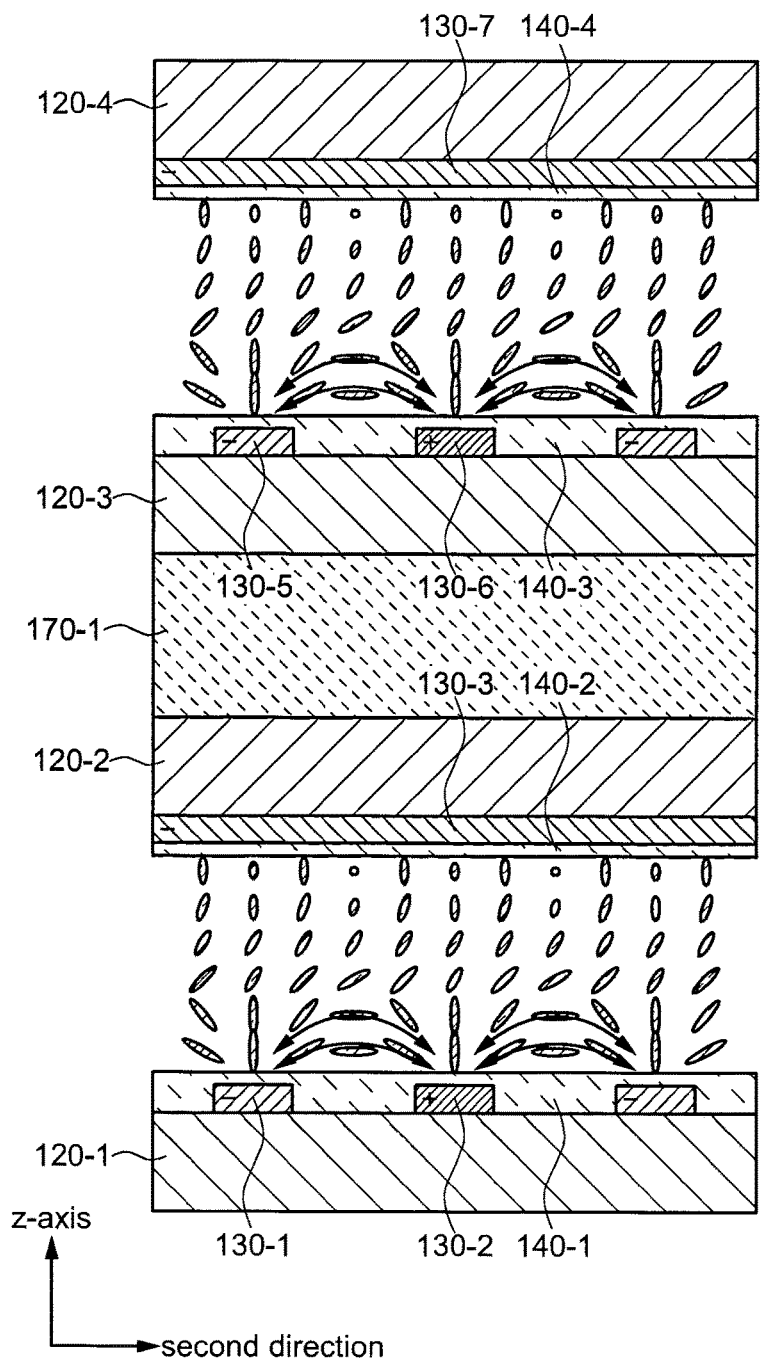
FIG. 3B is a schematic cross-sectional view illustrating control of a light distribution by an optical element of a lighting device according to an embodiment of the present invention.
Figure 3B:
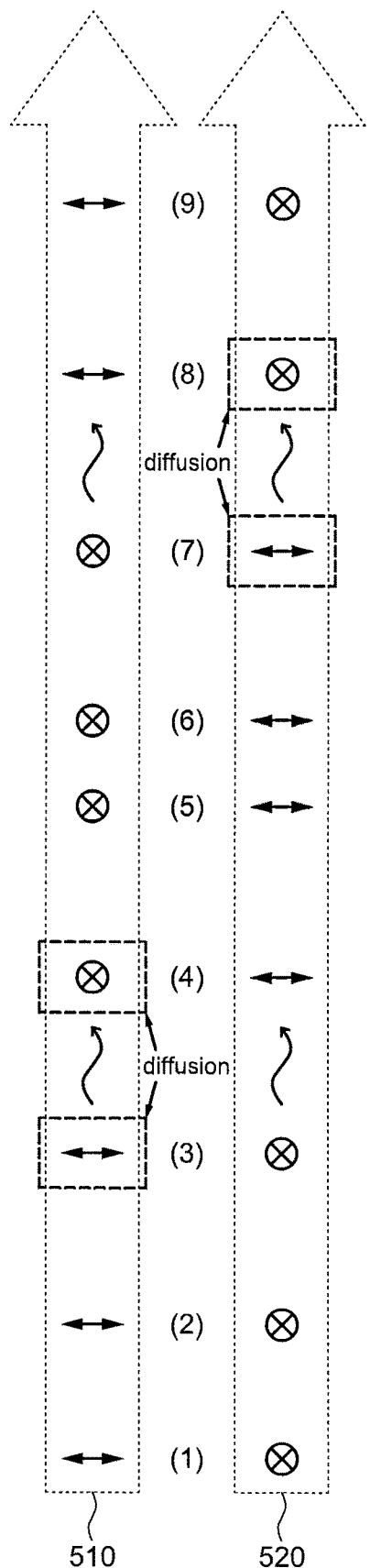

FIGS. 3A and 3B are schematic cross-sectional views illustrating the control of a light distribution by the optical element 100 of the lighting device 10 according to an embodiment of the present invention. FIGS. 3A and 3B show a part of a cross-sectional view of the first liquid crystal cell 110-1 and the second liquid crystal cell 110-2 shown in FIG. 2B. FIG. 3A shows the optical element 100 in a state where no potential is supplied to the transparent electrodes 130, and FIG. 3B shows the optical element 100 in a state where the transparent electrodes 130 are supplied with a potential.

The alignment treatment in the x-axis direction is performed on the first alignment film 140-1. Thus, as shown in FIG. 3A, the long axes of the liquid crystal molecules on the side of the first substrate 120-1 in the first liquid crystal layer 160-1 are aligned along the first direction. That is, the alignment direction of the liquid crystal molecules on the side of the first substrate 120-1 is orthogonal to the extending direction (second direction) of the first transparent electrode 130-1 and the second transparent electrode 130-2. Further, the alignment treatment in the second direction is performed on the second alignment film 140-2. Thus, as shown in FIG. 3A, the long axes of the liquid crystal molecules on the side of the second substrate 120-2 in the first liquid crystal layer 160-1 are aligned along the y-axis direction. That is, the alignment direction of the liquid crystal molecules on the side of the second substrate 120-2 is orthogonal to the extending direction (first direction) of the third transparent electrode 130-3 and the fourth transparent electrode 130-4. Therefore, the liquid crystal molecules in the first liquid crystal layer 160-1 gradually change the direction of their long axes from the first direction to the second direction moving from the first substrate 120-1 to the second substrate 120-2, and are aligned in a state twisted by 90 degrees.

Since the liquid crystal molecules in the second liquid crystal layer 160-2 are also similar to the liquid crystal molecules in the first liquid crystal layer 160-1, the description thereof is omitted here.

When potentials are supplied to the transparent electrodes 130, the alignment of the liquid crystal molecules changes as shown in FIG. 3B. Here, it is described that a low potential is supplied to the first transparent electrode 130-1, the third transparent electrode 130-3, the fifth transparent electrode 130-5, and the seventh transparent electrode 130-7, and a high potential is supplied to the second transparent electrode 130-2, the fourth transparent electrode 130-4, the sixth transparent electrode 130-6, and the eighth transparent electrode 130-8. In addition, in FIG. 3B, for convenience, the low potential and the high potential are illustrated using the symbols "−" and "+", respectively. In the following description, the electric field generated between adjacent transparent electrodes may be referred to as a lateral electric field.

As shown in FIG. 3B, the liquid crystal molecules on the side of the first substrate 120-1 are aligned as a whole in a convex arc shape along the x-axis direction with respect to the first substrate 120-1 due to the influence of the lateral electric field between the first transparent electrode 130-1 and the second transparent electrode 130-2. Similarly, the liquid crystal molecules on the side of the second substrate 120-2 are aligned as a whole in a convex arc shape along the y-axis direction with respect to the second substrate 120-2 due to the influence of the lateral electric field between the third transparent electrode 130-3 and the fourth transparent electrode 130-4. The alignment of the liquid crystal molecules located approximately in the center between the first transparent electrode 130-1 and the second transparent electrode 130-2 is hardly changed by any lateral electric field. Therefore, light incident on the first liquid crystal layer 160-1 is diffused in the first direction according to the refractive index distribution of the liquid crystal molecules on the side of the first substrate 120-1 aligned in the convex arc shape along the first direction, and then is diffused in the second direction according to the refractive index distribution of the liquid crystal molecules on the side of the second substrate 120-2 aligned in the convex arc shape along the second direction.

In addition, since the first substrate 120-1 and the second substrate 120-2 have a sufficiently large distance between the substrates, the lateral electric field between the first transparent electrode 130-1 and the second transparent electrode 130-2 of the first substrate 120-1 does not affect the alignment of the liquid crystal molecules on the second substrate 120-2, or is negligibly small. Similarly, the lateral electric field between the third transparent electrode 130-3 and the fourth transparent electrode 130-4 of the second substrate 120-2 does not affect the alignment of the liquid crystal molecules on the first substrate 120-1, or is negligibly small.

Since the alignment of the liquid crystal molecules in the second liquid crystal layer 160-2 in the case where potentials are supplied to the fifth transparent electrode 130-5 to the eighth transparent electrode 130-8 are also the same as the alignment of the liquid crystal molecules in the first liquid crystal layer 160-1, the description thereof is omitted here.

Next, the distribution of light passing through the optical element 100 is described. Light emitted from the light source has a polarization component in the x-axis direction (P-polarization component) and a polarization component in the y-axis direction (S-polarization component). However, for convenience, the polarization component of the light is divided into the P-polarization component and the S-polarization component that are perpendicular to each other in the following description. That is, the light emitted from the light source (see (1) in FIGS. 3A and 3B) includes a first polarized light 510 having the P-polarization component and a second polarized light 520 having the S-polarization component. In addition, an arrow symbol and a circle symbol with a cross in FIGS. 3A and 3B represent the P-polarization component and the S-polarization component, respectively.

After the first polarized light 510 is incident on the first substrate 120-1, the polarization component of the first polarized light 510 changes from the P-polarization component to the S-polarization component according to the twist of the alignment of the liquid crystal molecules as the first polarized light 510 approaches the second substrate 120-2 (see (2) to (4) in FIGS. 3A and 3B). More specifically, although the first polarized light 510 has the polarization axis in the x-axis direction on the side of the first substrate 120-1, the polarization axis of the first polarized light 510 is gradually changed in the process of passing in the thickness direction of the first liquid crystal layer 160-1 and the first polarized light 510 has the S-polarization component on the side of the second substrate 120-2. Then, the first polarized light 510 is emitted from the second substrate 120-2 (see (5) in FIGS. 3A and 3B).

Here, when a lateral electric field is generated between the first transparent electrode 130-1 and the second transparent electrode 130-2, the liquid crystal molecules on the side of the first substrate 120-1 are arranged along the first direction in the convex arc shape due to the influence of the lateral electric field and the refractive index distribution changes. Therefore, the first polarized light 510 is diffused in the first direction according to the refractive index distribution of the liquid crystal molecules. Further, when a lateral electric field is generated between the third transparent electrode 130-3 and the fourth transparent electrode 130-4, the liquid crystal molecules on the side of the second substrate 120-2 are arranged along the second direction in the convex arc shape due to the influence of the lateral electric field and the refractive index distribution changes. Therefore, the first polarized light 510 is diffused in the second direction according to the change in the refractive index distribution of the liquid crystal molecules.

Therefore, when no lateral electric field is generated (see FIG. 3A), the polarization component of the first polarized light 510 transmitted through the first liquid crystal cell 110-1 changes from the P polarization component to the S polarization component. On the other hand, when the lateral electric field is generated (see FIG. 3B), the polarization component of the first polarized light 510 transmitted through the first liquid crystal cell 110-1 changes from the P polarization component to the S polarization component, and the first polarized light 510 is diffused in the first direction and in the second direction.

After the second polarized light 520 is incident on the first substrate 120-1, the polarization component of the second polarized light 520 changes from the S-polarization component to the P-polarization component according to the twist of the alignment of the liquid crystal molecules as the second polarized light 520 approaches the second substrate 120-2 (see (2) to (4) in FIGS. 3A and 3B). More specifically, although the second polarized light 520 has the polarization axis in the y-axis direction on the side of the first substrate 120-1, the polarization axis of the second polarized light 520 is gradually changed in the process of passing in the thickness direction of the first liquid crystal layer 160-1 and the second polarized light 520 has the P-polarization component on the side of the second substrate 120-2, and then, the second polarized light 520 is emitted from the second substrate 120-2 (see (5) in FIGS. 3A and 3B).

Here, when a lateral electric field is generated between the first transparent electrode 130-1 and the second transparent electrode 130-2, the liquid crystal molecules on the side of the first substrate 120-1 are arranged along the x-axis in the convex arc shape due to the influence of the lateral electric field and the refractive index distribution changes. However, since the polarization axis of the second polarized light 520 is orthogonal to the alignment of the liquid crystal molecules on the side of the first substrate 120-1 side, the second polarized light 520 is not affected by the refractive index distribution of the liquid crystal molecules and passes without being diffused. Further, when a lateral electric field is generated between the third transparent electrode 130-3 and the fourth transparent electrode 130-4, the liquid crystal molecules on the side of the second substrate 120-2 are arranged in the y-axis direction in the convex arc shape due to the influence of the transverse electric field and the refractive index distribution changes. However, since the polarization axis of the second polarized light 520 is orthogonal to the alignment of the liquid crystal molecules on the side of the second substrate 120-2, the second polarized light 520 is not affected by the refractive index distribution of the liquid crystal molecules and passes without being diffused.

Therefore, not only when no lateral electric field is generated (see FIG. 3A) but also when a lateral electric field is generated (see FIG. 3B), the polarization component of the second polarized light 520 transmitted through the first liquid crystal cell 110-1 changes from the S-polarization component to the P-polarization component but the second polarized light 520 is not diffused.

The liquid crystal molecules in the second liquid crystal layer 160-2 of the second liquid crystal cell 110-2 also have the same refractive index distribution as the liquid crystal molecules in the first liquid crystal layer 160-1 of the first liquid crystal cell 110-1. However, since the polarization axes of the first polarized light 510 and the second polarized light 520 change by transmission through the first liquid crystal cell 110-1, the polarized light affected by the refractive index distribution of the liquid crystal molecules in the second liquid crystal layer 160-2 is reversed. That is, not only when no lateral electric field is generated (see FIG. 3A) but also when a lateral electric field is generated (see FIG. 3B), the polarization component of the first polarized light 510 transmitted through the second liquid crystal cell 110-2 changes from the S-polarization component to the P-polarization component but the first polarized light 510 is not diffused (see (6) to (8) in FIGS. 3A and 3B). On the other hand, when no lateral electric field is generated (see FIG. 3A), the polarization component of the second polarized light 520 transmitted through the second liquid crystal cell 110-2 only changes from the P-polarization component to the S-polarization component. However, when a lateral electric field is generated (see FIG. 3B), the polarization component of the second polarized light 520 transmitted through the second liquid crystal cell 110-2 changes from the P-polarization component to the S-polarization component, and the second polarized light 520 is diffused in the first direction and in the second direction.

As can be seen from the above, in the optical element 100, by stacking the two liquid crystal cells 110, the polarization direction of the light incident on the optical element 10 changes twice. Thus, the same polarization direction of light before entering the optical element 10 and after being emitted from the optical element 10 can be maintained (see (1) and (9) in FIGS. 3A and 3B). On the other hand, in the optical element 10, the refractive index distribution of the liquid crystal molecules in the liquid crystal layer 160 of the liquid crystal cell 110 can change and the transmitted light can be refracted. More specifically, the first liquid crystal cell 110 diffuses the light of the first polarized component 510 (P-polarization component) in the first direction, the second direction, or both the first and second directions, and the liquid crystal cell 120 diffuses the light of the second polarized component 520 (S-polarization component) in the first direction, the second direction, or both the first and second directions.

In FIGS. 3A and 3B, although only the first liquid crystal cell 110-1 and the second liquid crystal cell 110-2 are illustrated and the light distribution of the light transmitted through the first liquid crystal cell 110-1 and the second liquid crystal cell 110-2 is described, the same applies to the light distribution of light transmitted through the third liquid crystal cell 110-3 and the fourth liquid crystal cell 110-4. However, the third liquid crystal cell 110-3 and the fourth liquid crystal cell 110-4 are stacked and rotated by 90 degrees with respect to the first liquid crystal cell 110-1 and the second liquid crystal cell 110-2. As a result, the polarization components that act are swapped. That is, the third liquid crystal cell 110-3 can diffuse the second polarized light 520 (S-polarization component) in the first direction, the second direction, or both the first and second directions, and the fourth liquid crystal cell 110-4 can diffuse the first polarized light 510 (P-polarization component) in the first direction, the second direction, or both the first and second directions.

As described above, in the optical element 100, the transmitted light can be diffused in a predetermined direction by supplying a potential to a predetermined transparent electrode 130. On the other hand, in the lighting device 10, the light emitted from the light emitting module 200 is the collimated light, and when no potential is supplied to the transparent electrode 130, the shape of the light distribution of the light that passes through the optical element 100 is anisotropic. Even in such a case, it can be corrected using the optical element 100. In the following description, correction of the shape of the light distribution by the optical element 100 is described.

[4. Correction of Shape of Light Distribution by Optical Element 100]

Figure 4:
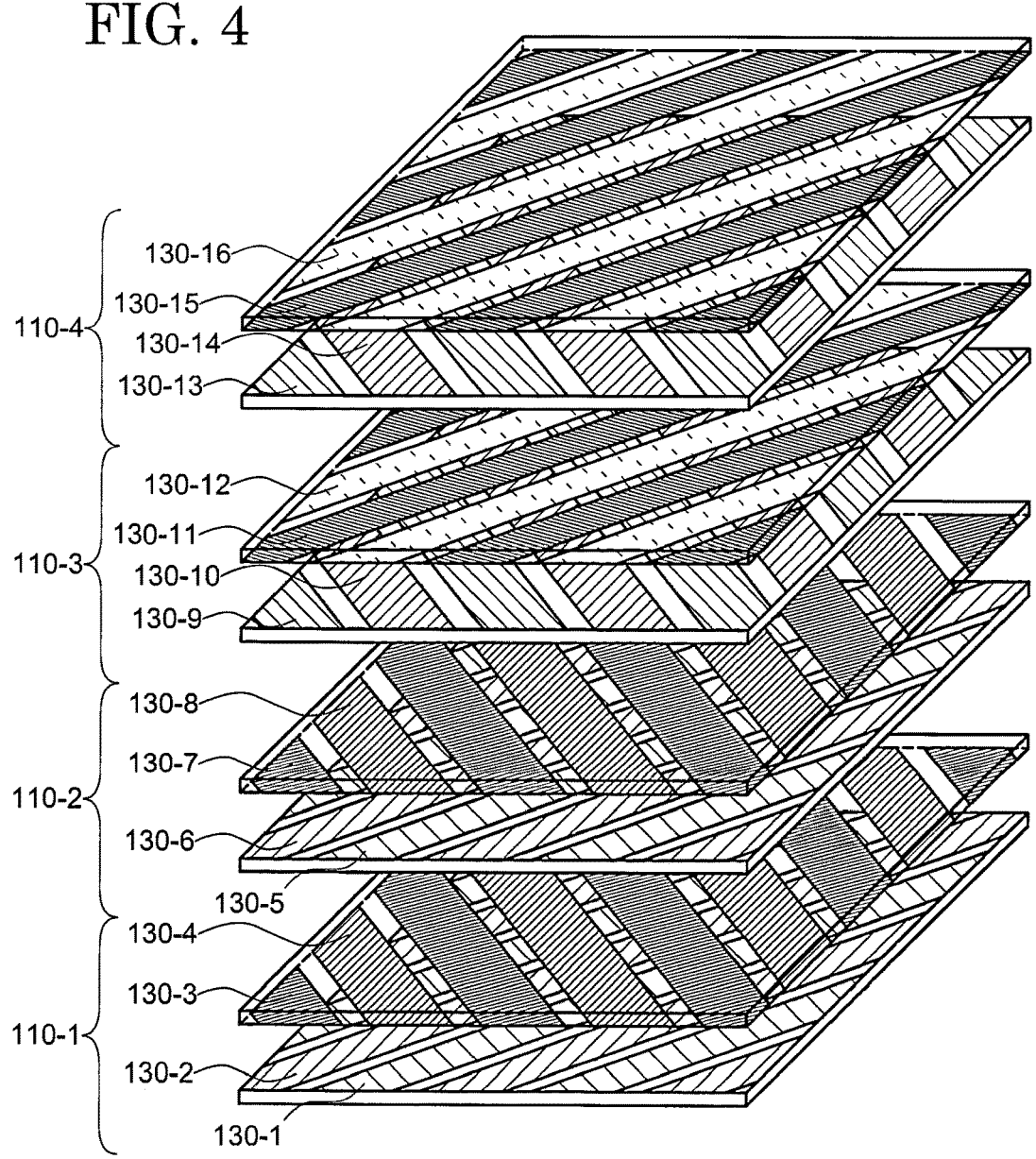
FIG. 4 is a schematic diagram illustrating the relationship between an optical element and a light emitting module of a lighting device according to an embodiment of the present invention.
Figure 4:
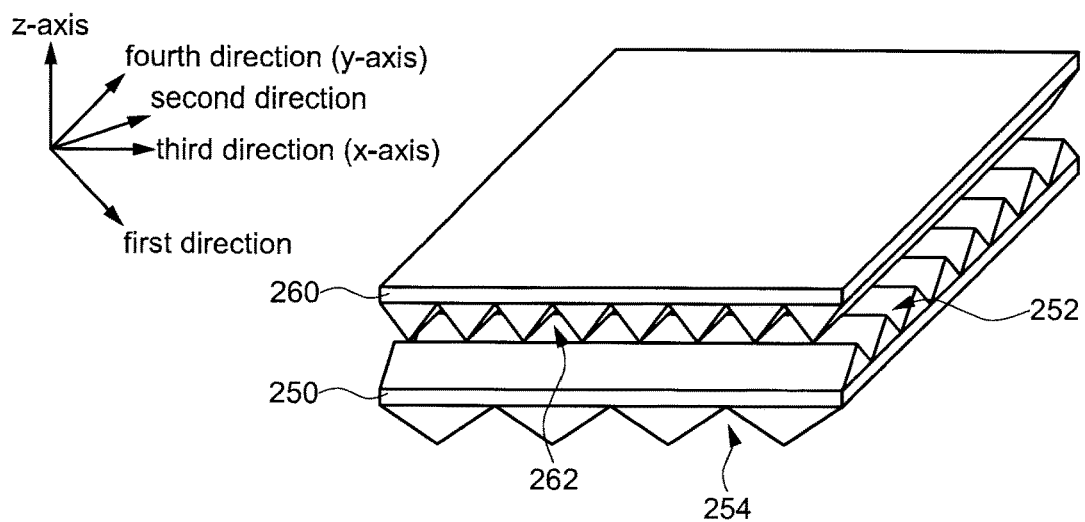

FIG. 4 is a schematic diagram illustrating the relationship between the optical element 100 and the light emitting module 200 of the lighting device 10 according to an embodiment of the present invention. In addition, FIG. 4 schematically shows the transparent electrode 130 of the liquid crystal cell 110 of the optical element 100, and the light guide plate 250 and the prism sheet 260 of the light emitting module 200.

In the optical element 100, the first transparent electrode 130-1, the second transparent electrode 130-2, the fifth transparent electrode 130-5, the sixth transparent electrode 130-6, the eleventh transparent electrode 130-11, the twelfth transparent electrode 130-12, the fifteenth transparent electrode 130-15, and the sixteenth transparent electrode 130-16 extend in the second direction. Further, the third transparent electrode 130-3, the fourth transparent electrode 130-4, the seventh transparent electrode 130-7, the eighth transparent electrode 130-8, the ninth transparent electrode 130-9, the tenth transparent electrode 130-10, the thirteenth transparent electrode 130-13, and the fourteenth transparent electrode 130-14 extend in the first direction. On the other hand, in the light emitting module 200, the first groove 252 of the light guide plate 250 extends in the third direction. Further, the second groove 254 of the light guide plate 250 and the groove 262 of the prism sheet 260 extend in the fourth direction. That is, in the plan view, the extending direction of the transparent electrode 130 and the extending direction of the first groove 252 or the second groove 254 of the light guide plate 250 or the extending direction of the groove 262 of the prism sheet 260 intersect each other at 45 degrees or 135 degrees.

Figure 5:
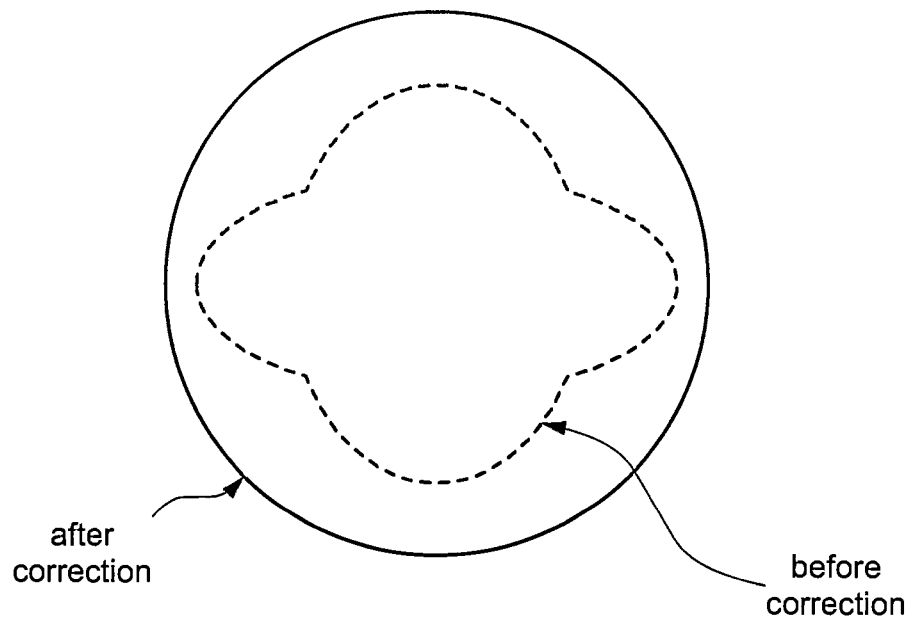
FIG. 5 is a schematic diagram illustrating a shape of a light distribution before and after correction in a lighting device according to an embodiment of the present invention.
Figure 5:
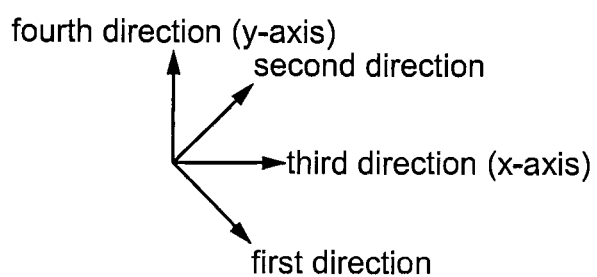

FIG. 5 is a schematic diagram illustrating the shape of the light distribution before and after correction in the lighting device 10 according to an embodiment of the present invention. The broken line in FIG. 5 shows the shape of the light distribution when no potential is supplied to the transparent electrode 130. In the present embodiment, the light emitting module 200 emits light from the center of its emitting area. In the lighting device 10, the first groove 252 and the second groove 254 of the light guide plate 250 of the light emitting module 200 and the groove 262 of the prism sheet 260 extend in the third direction or the fourth direction. Therefore, the shape of the light distribution of the light emitted from the light emitting module 200 and transmitted through the optical element 100 may have different lengths in the third direction and the fourth direction. For example, as shown by the broken line in FIG. 5, a cross shape in which the length in the fourth direction is smaller than the length in the third direction may be formed. In other words, the cross shape shown by the broken line in FIG. 5 has depressed portions in the first direction and the second direction. In this case, by adjusting the potential supplied to the transparent electrode 130 extending in the first direction or the second direction, the optical element 100 diffuses the light in the first direction or the second direction. The shape of the light distribution can be corrected as shown by the solid line in FIG. 5. For example, potentials can be supplied to the transparent electrodes 130 such that the potential difference between adjacent transparent electrodes 130 on the substrate 120 is 2 V. The values of the potentials required for such correction can be stored in the lookup table 322 in advance. That is, in the lighting device 10, the control unit 300 can read the lookup table 322 in the storage part 320 and easily correct the shape of the light distribution.

In addition, although an example of the lighting device 10 in which the extending direction of the transparent electrode 130 and the extending direction of the first groove 252 or the second groove 254 of the light guide plate 250 or the extending direction of the groove 262 of the prism sheet 260 intersect each other at 45 degrees or 135 degrees is described in the above description, the angle between the extending directions is not limited thereto. The angle may be approximately 45 degrees or approximately 135 degrees.

As described above, according to the lighting device 10 according to an embodiment of the present invention, the shape of the light distribution of the light emitted from the light emitting module 200 can be corrected by the optical element 100. That is, in the lighting device 10, since the extending direction of the transparent electrode 130 is different from the extending direction of the first groove 252 or the second groove 254 of the light guide plate 250 or the extending direction of the groove 262 of the prism sheet 260, the shape of the light distribution can be corrected by controlling the optical element 100 when the light transmits through the optical element 100.

Second Embodiment

A lighting device 10A is described with reference to FIGS. 6 to 7C. In the following description, when a configuration of the lighting device 10A is similar to the configuration of the lighting device 10, the description thereof may be omitted.

Figure 6:
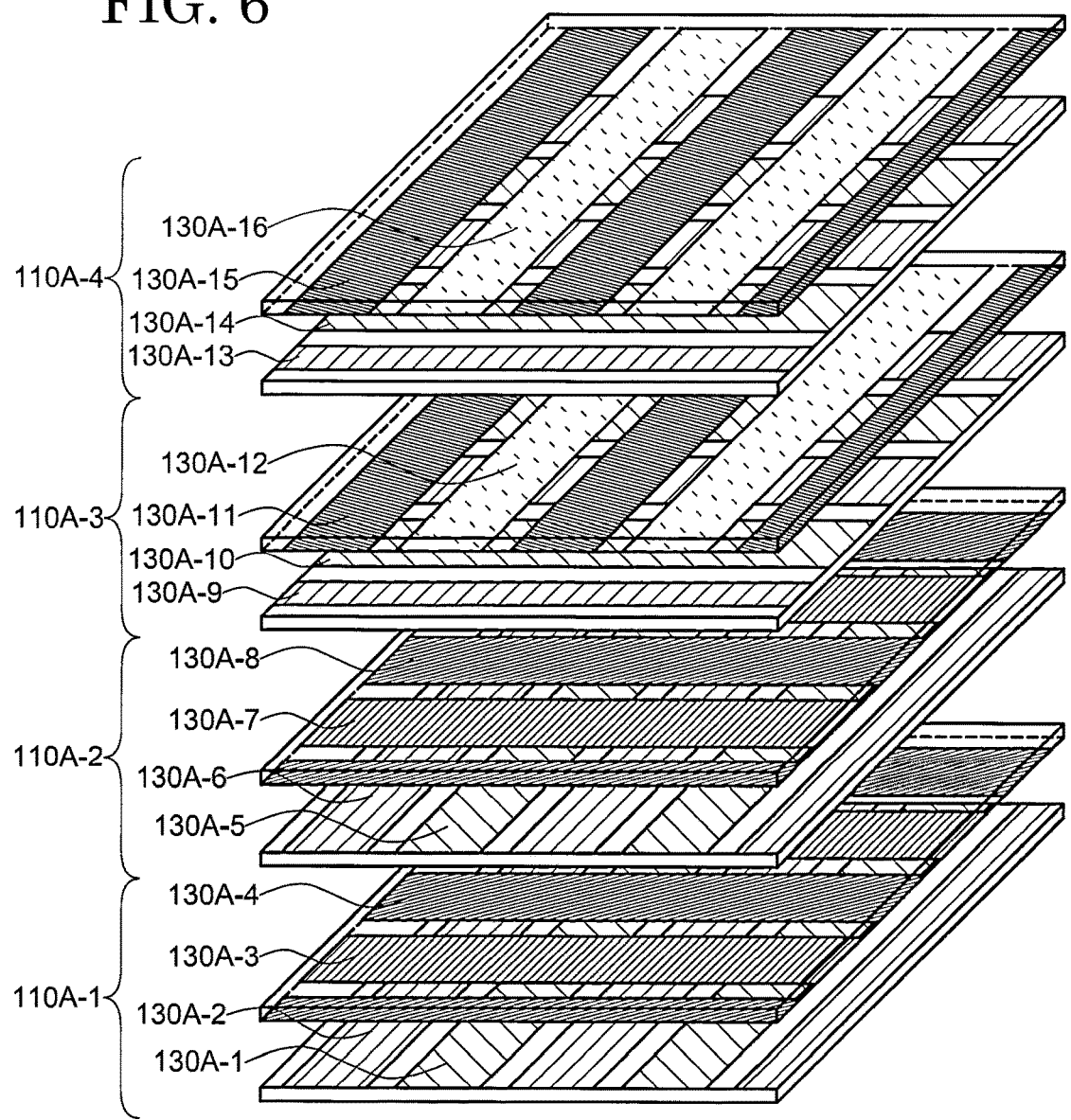
FIG. 6 is a schematic diagram illustrating the relationship between an optical element and a light emitting module of a lighting device according to an embodiment of the present invention.
Figure 6:
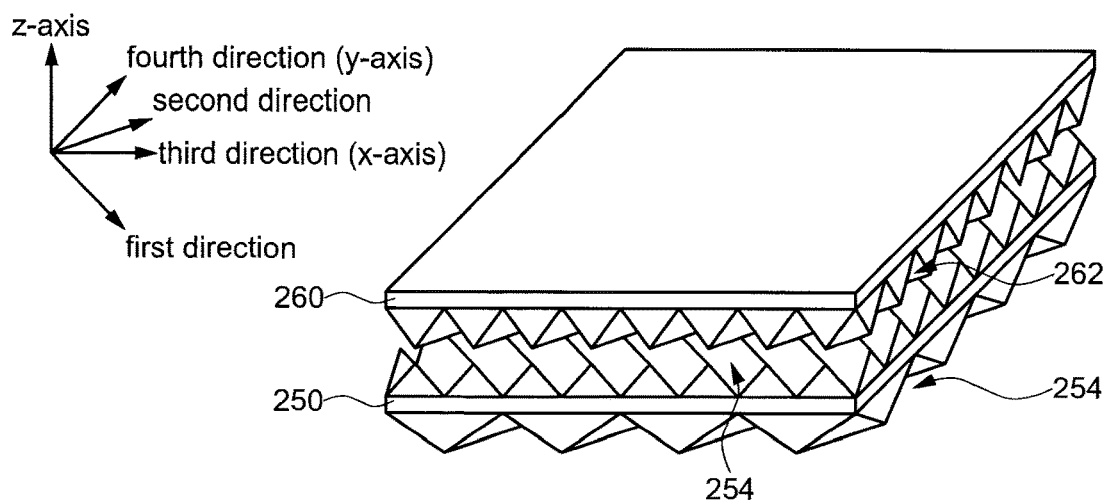

FIG. 6 is a schematic diagram illustrating the relationship between an optical element 100A and a light emitting module 200A of the lighting device 10A according to an embodiment of the present invention. In addition, FIG. 6 schematically shows a transparent electrode 130A of a liquid crystal cell 110A of the optical element 100A, and a light guide plate 250A and a prism sheet 260A of the light emitting module 200A.

In the optical element 100A, a first transparent electrode 130A-1, a second transparent electrode 130A-2, a fifth transparent electrode 130A-5, a sixth transparent electrode 130A-6, an eleventh transparent electrode 130A-11, a twelfth transparent electrode 130A-12, a fifteenth transparent electrode 130A-15, and a sixteenth transparent electrode 130A-16 extend in the fourth direction. Further, a third transparent electrode 130A-3, a fourth transparent electrode 130A-4, a seventh transparent electrode 130A-7, an eighth transparent electrode 130A-8, a ninth transparent electrode 130A-9, a tenth transparent electrode 130A-10, a thirteenth transparent electrode 130A-13, and a fourteenth transparent electrode 130A-14 extend in the third direction. On the other hand, in the light emitting module 200A, a first groove 252A of the light guide plate 250A extends in the first direction. Further, a second groove 254A of the light guide plate 250A and a groove 262A of the prism sheet 260A extend in the second direction. That is, in a plan view, the extending direction of the transparent electrode 130A and the extending direction of the first groove 252A or the second groove 254A of the light guide plate 250A or the extending direction of the groove 262A of the prism sheet 260A intersect each other at 45 degrees or 135 degrees.

Figure 7A:
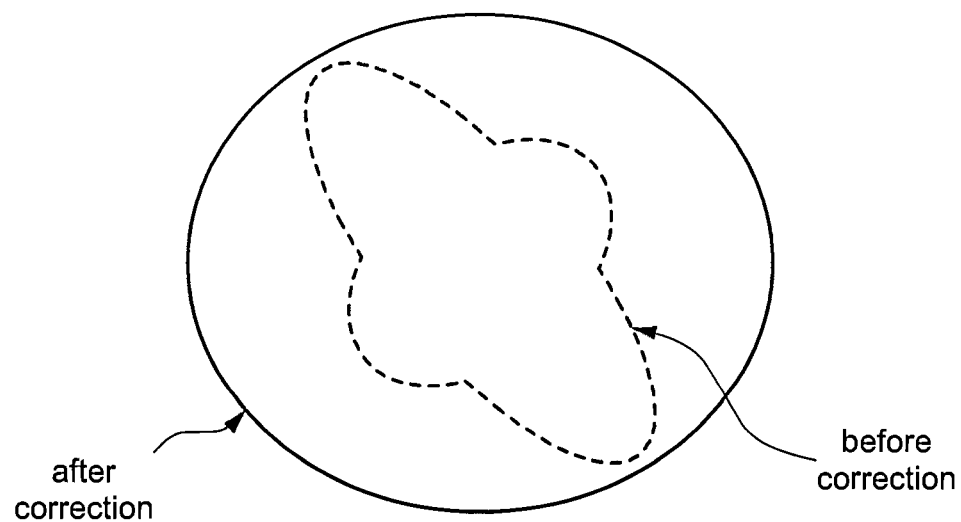
FIG. 7A is a schematic diagram illustrating a shape of a light distribution before and after correction in a lighting device according to an embodiment of the present invention.
Figure 7A:
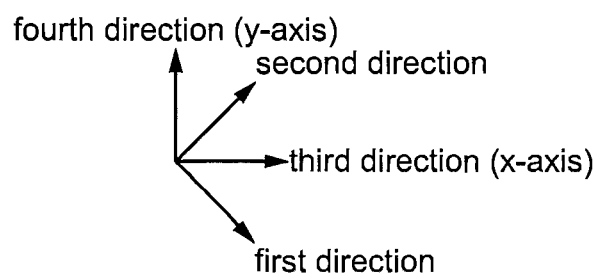
Figure 7B:
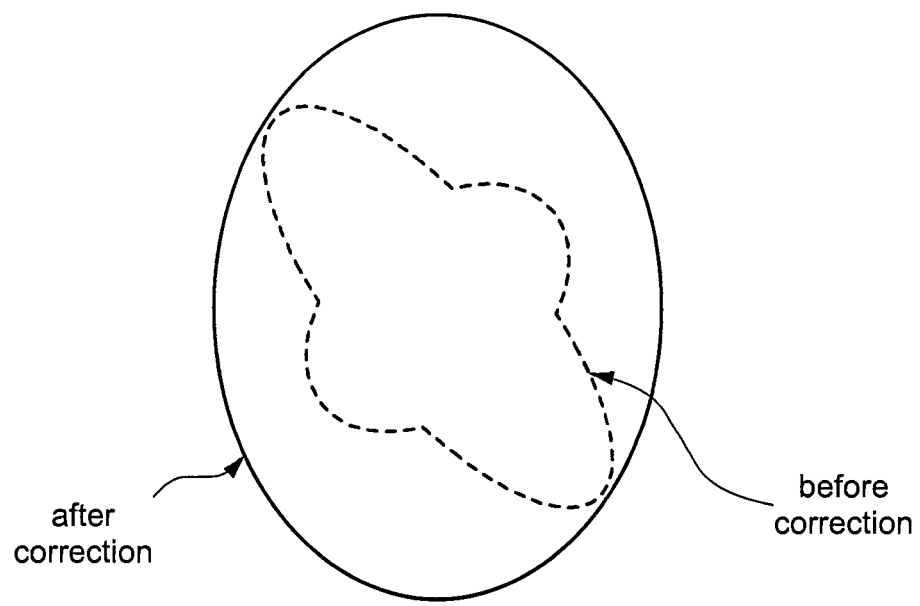
FIG. 7B is a schematic diagram illustrating a shape of a light distribution before and after correction in a lighting device according to an embodiment of the present invention.
Figure 7B:
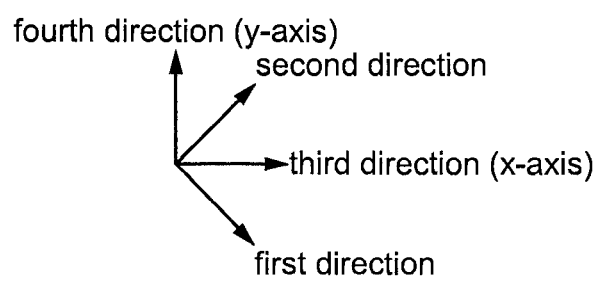
Figure 7C:
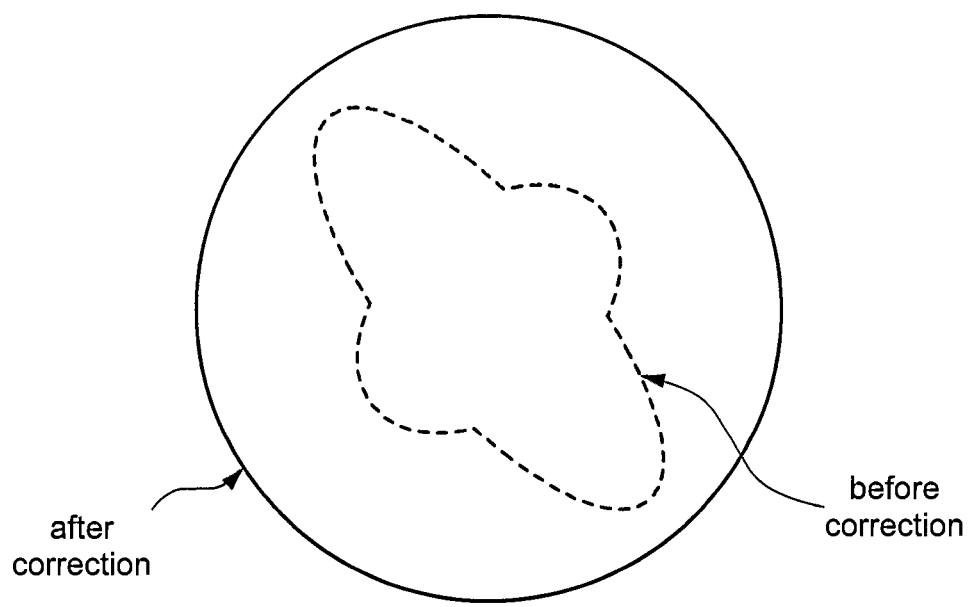
FIG. 7C is a schematic diagram illustrating a shape of a light distribution before and after correction in a lighting device according to an embodiment of the present invention.
Figure 7C:
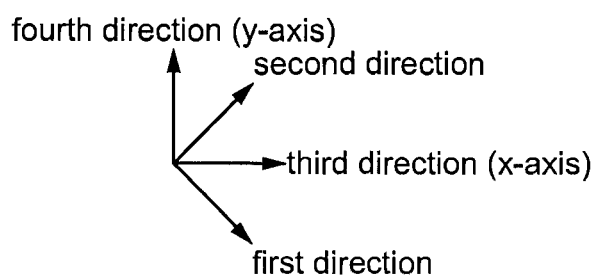

FIGS. 7A to 7C are schematic diagrams illustrating shapes of a light distribution before and after correction in the lighting device 10A according to an embodiment of the present invention. The broken lines in FIGS. 7A to 7C show shapes of the light distribution when no potential is supplied to the transparent electrode 130A. In the lighting device 10A, the first groove 252A and the second groove 254A of the light guide plate 250A of the light emitting module 200A and the groove 262A of the prism sheet 260A extend in the first direction or the second direction. Therefore, the shape of the light distribution of the light emitted from the light emitting module 200A and transmitted through the optical element 100A may have different lengths in the first direction and the second direction. For example, as shown by the broken lines in FIGS. 7A to 7C, a cross shape in which the length in the second direction is smaller than the length in the first direction may be formed. In other words, the cross shape shown by the broken line in FIGS. 7A to 7C has depressed portions in the third direction and the fourth direction. In this case, by adjusting the potential supplied to the transparent electrode 130A extending in the third direction or the fourth direction, the optical element 100A diffuses the light in the third direction or the fourth direction. The shapes of the light distribution can be corrected as shown by the solid line in FIGS. 7A to 7C. For example, a potential is supplied to each transparent electrode 130 such that the potential difference between adjacent transparent electrodes 130 is shown in Table 1.

TABLE 1

| | potential difference (1) | potential difference (2) | potential difference (3) |
|---|---|---|---|
| between the first transparent electrode and the second transparent electrode | 1 V | 3 V | 3 V |
| between the third transparent electrode and the fourth transparent electrode | 3 V | 1 V | 3 V |
| between the fifth transparent electrode and the sixth transparent electrode | 1 V | 3 V | 3 V |
| between the seventh transparent electrode and the eighth transparent electrode | 3 V | 1 V | 3 V |
| between the ninth transparent electrode and the 10th transparent electrode | 3 V | 1 V | 3 V |
| between the eleventh transparent electrode and the twelfth transparent electrode | 1 V | 3 V | 3 V |
| between the thirteenth transparent electrode and the fourteenth transparent electrode | 3 V | 1 V | 3 V |
| between the fifteenth transparent electrode and the sixteenth transparent electrode | 1 V | 3 V | 3 V |

The shapes of the light distribution shown by the solid lines in FIGS. 7A to 7C are formed when a potential is supplied to each transparent electrode 130 to be the potential difference (1), the potential difference (2), and the potential difference (3) in Table 1, respectively. As can be seen from Table 1 and FIGS. 7A to 7C, by adjusting the potential supplied to the transparent electrode 130, the shape of the light distribution can be corrected not only to a circular shape but also to an elliptical shape. Further, when the difference between the length in the first direction and the length in the second direction is large, the shape of the light distribution can be corrected by increasing the potential difference between adjacent transparent electrodes 130.

As described above, according to the lighting device 10A according to an embodiment of the present invention, the shape of the light distribution of the light emitted from the light emitting module 200A can be corrected by the optical element 100A. That is, in the lighting device 10A, since the extending direction of the transparent electrode 130A is different from the extending direction of the first groove 252A or the second groove 254A of the light guide plate 250A or the extending direction of the groove 262A of the prism sheet 260, the shape of the light distribution can be corrected by controlling the optical element 100A when the light transmits through the optical element 100A.

Third Embodiment

A lighting device 10B is described with reference to FIGS. 8 to 9C. In the following description, when a configuration of the lighting device 10B is similar to the configuration of the lighting device 10, the description thereof may be omitted.

Figure 8:
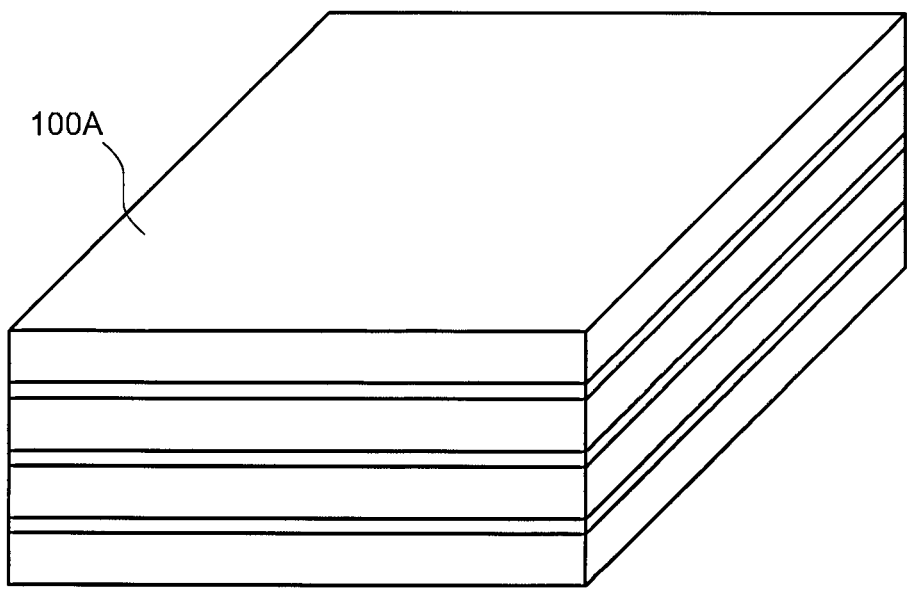
FIG. 8 is a schematic exploded perspective view of a lighting device according to an embodiment of the present invention.
Figure 8:
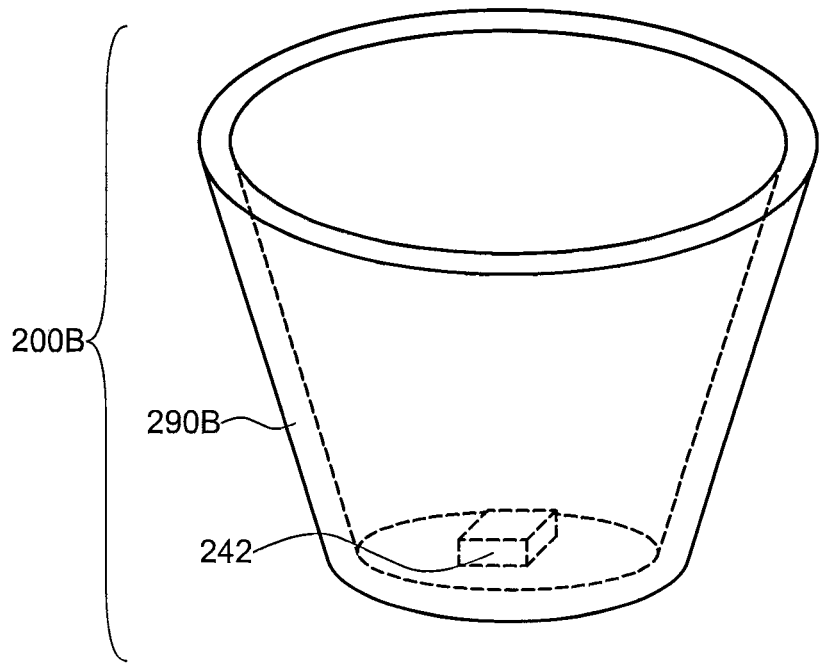
Figure 8:
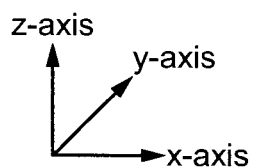

FIG. 8 is a schematic exploded perspective view of the lighting device 10B according to an embodiment of the present invention. As shown in FIG. 8, the lighting device 10B includes the optical element 100A and a light emitting module 200B. The light emitting module 200B includes the LED element 242 and a reflector 290B.

The reflector 290B has a substantially truncated conical shape with an interior cavity. The LED element 242 is provided in the reflector 290B. That is, the LED element 242 is arranged on a bottom surface of the reflector 290B and surrounded by a side surface of the reflector 290B. The light emitted from the LED element 242 is reflected by the bottom surface or the side surface of the reflector 290B and enters the optical element 100. In addition, the shape of the reflector 290B is not limited to the substantially truncated conical shape. The shape of the reflector 290B may be, for example, a polygonal column. Further, the bottom surface or the side surface of the reflector 290B may be a flat surface or a curved surface.

The shape of the light distribution of the light emitted from the light emitting module 200B may become anisotropic due to the shape of the reflector 290B or variations in the mounting of the LED elements 242. In this case, the shape of the light distribution of light emitted from the optical element 100A in which no potential is applied to each transparent electrode 130A also becomes anisotropic. For example, when the shape of the light distribution of the light emitted from the optical element 100A is an ellipse in which the length in the y-axis direction is smaller than the length in the x-axis direction, the light can be diffused in the y-axis direction using the optical element 100A that includes the transparent electrode 130A extending in the x-axis and the y-axis directions to correct the shape of the light distribution to be isotropic. Further, by storing the value of the potentials to be supplied to the transparent electrodes 130A in the lookup table 322, the potentials that can always correct the shape of light distribution can be supplied.

In addition, when the long axis direction or the short axis direction of the shape of the light distribution before correction does not match the extending direction of the transparent electrode 130A of the optical element 100A, the arrangement of the optical element 100A with respect to the light emitting module 200B can be adjusted so that the extending direction of the transparent electrode 130A matches the long axis or the short axis direction before correction. Further, the optical element 100 can also be used instead of the optical element 100A.

Further, in the lighting device 10B, the optical element 100A can be used to not only correct the shape of the light distribution but also control the shape of the light distribution.

Figure 9A:
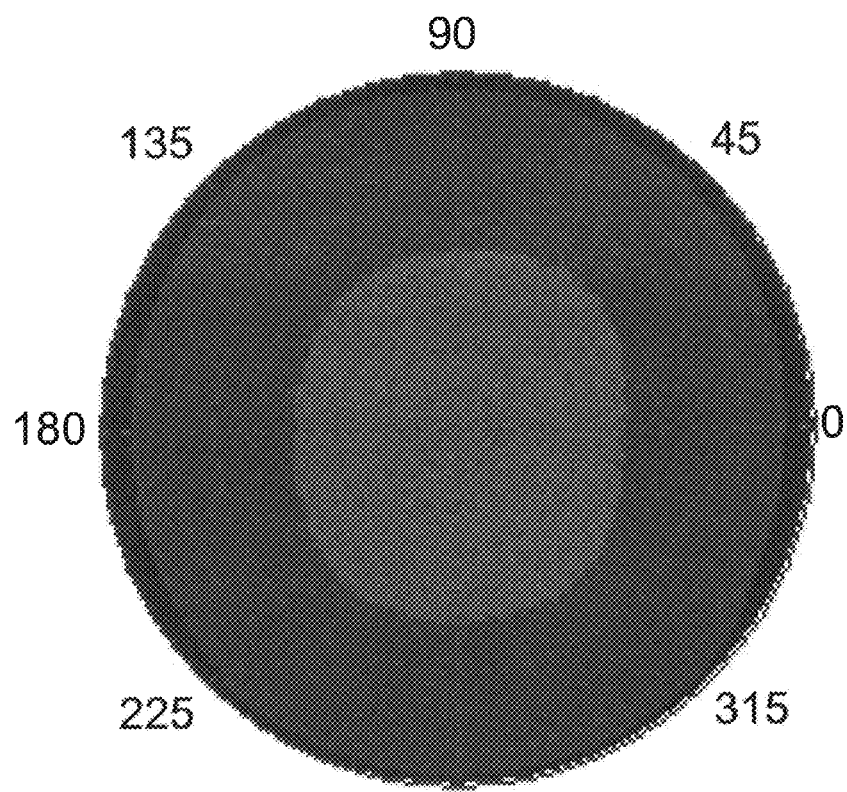
FIG. 9A is a measurement result of a shape of a light distribution of light emitted from a lighting device according to an embodiment of the present invention.
Figure 9A:
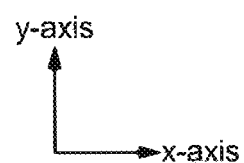
Figure 9B:
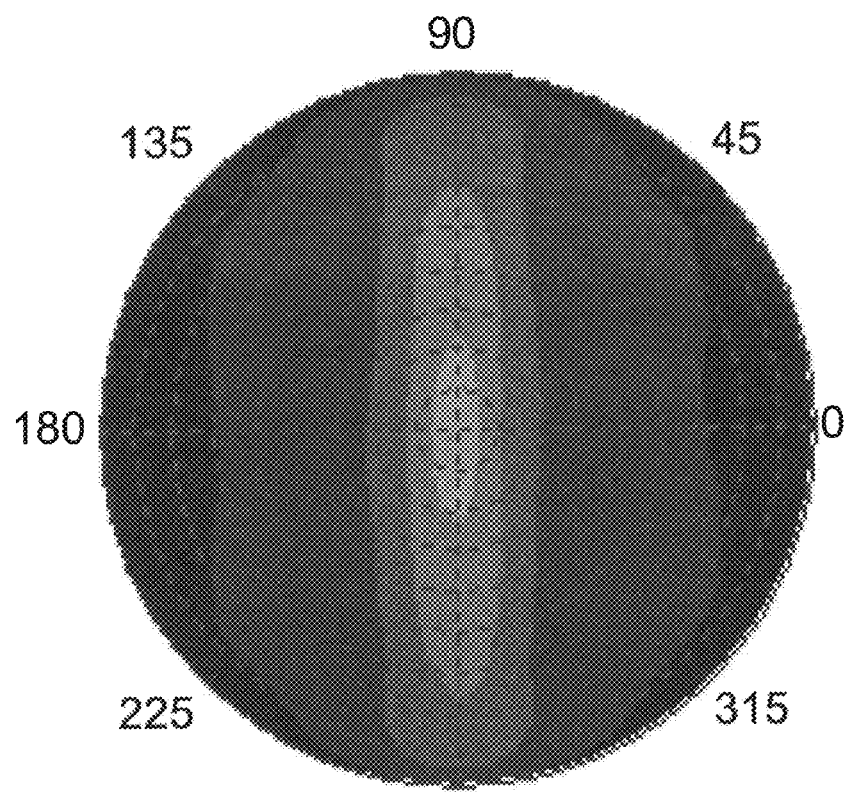
FIG. 9B is a measurement result of a shape of a light distribution of light emitted from a lighting device according to an embodiment of the present invention.
Figure 9B:
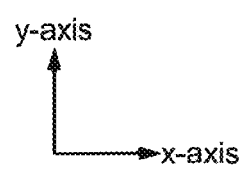
Figure 9C:
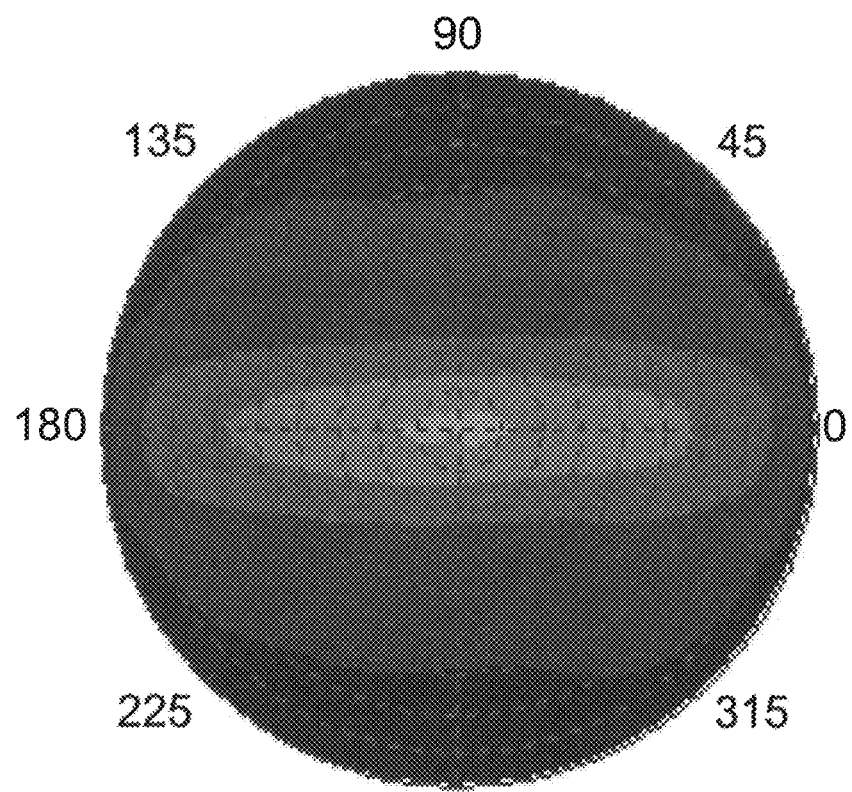
FIG. 9C is a measurement result of a shape of a light distribution of light emitted from a lighting device according to an embodiment of the present invention.
Figure 9C:
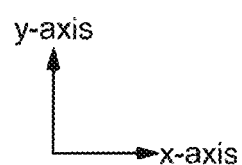

FIGS. 9A to 9C are measurement results of the shape of the light distribution of light emitted from the lighting device 10B according to an embodiment of the present invention. Specifically, FIGS. 9A to 9C show the measurement results of azimuth angles of the light emitted from the lighting device 10B when the manufactured lighting device 10B is supplied with potential differences (4) to (6) shown in Table 2, respectively.

TABLE 2

|  | potential difference (4) | potential difference (5) | potential difference (6) |
| --- | --- | --- | --- |
| between the first transparent electrode and the second transparent electrode | 30 V | 0 V | 30 V |
| between the third transparent electrode and the fourth transparent electrode | 30 V | 30 V | 0 V |
| between the fifth transparent electrode and the sixth transparent electrode | 30 V | 0 V | 30 V |
| between the seventh transparent electrode and the eighth transparent electrode | 30 V | 30 V | 0 V |
| between the ninth transparent electrode and the 10th transparent electrode | 30 V | 30 V | 0 V |
| between the eleventh transparent electrode and the twelfth transparent electrode | 30 V | 0 V | 30 V |
| between the thirteenth transparent electrode and the fourteenth transparent electrode | 30 V | 30 V | 0 V |
| between the fifteenth transparent electrode and the sixteenth transparent electrode | 30 V | 0 V | 30 V |

When a potential was supplied to each transparent electrode 130 so that the potential difference between adjacent transparent electrodes 130 is 30 V as shown in the potential difference (4), the shape of the light distribution with light diffusing in the x-axis and y-axis directions as shown in FIG. 9A was obtained. Further, when a potential was supplied to each transparent electrode 130 so that each liquid crystal cell 110 diffuses light in the y-axis direction as shown in the potential difference (5), the shape of the light distribution with light spreading in the y-axis direction as shown in FIG. 9B was obtained. Furthermore, when a potential was supplied to each transparent electrode 130 so that each liquid crystal cell 110 diffuses light in the x-axis direction as shown in the potential difference (6), the shape of the light distribution with light spreading in the x-axis direction as shown in FIG. 9C was obtained.

As described above, in the lighting device 10B according to an embodiment of the present invention, the shape of the light distribution of the light emitted from the light emitting module 200B can be corrected by the optical element 100 or the optical element 100A. Therefore, the degree of freedom in designing the light emitting module 200B, especially the reflector 290B, is expanded. In other words, various light emitting modules 200B can be used as the lighting device 10B.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. A lighting device comprising:
a light emitting module; and
an optical element transmitting light emitted from the light emitting module, in which a first liquid crystal cell and a second liquid crystal cell are stacked,
wherein each of the first liquid crystal cell and the second liquid crystal cell comprises:
a first substrate on which a first transparent electrode and a second transparent electrode are alternately arranged in a first direction; and
a second substrate on which a third transparent electrode and a fourth transparent electrode are alternately arranged in a second direction intersecting the first direction,
the light emitting module comprises:
a light source;
a light guide plate comprising an end surface into which light emitted from the light source is incident and a first surface from which the light incident into the end surface is emitted; and
a prism sheet disposed opposite to the first surface,
the second substrate of the first liquid crystal cell and the first substrate of the second liquid crystal cell are adjacent to each other, and
the first surface comprises a plurality of first grooves extending in a third direction intersecting the first direction and the second direction.

2. The lighting device according to claim 1, wherein the light emitted from the light emitting module is collimated light.

3. The lighting device according to claim 1, wherein a second surface opposite to the first surface of the light guide plate comprises a plurality of second grooves extending in a fourth direction intersecting the third direction.

4. The lighting device according to claim 3, wherein the optical element comprises a third liquid crystal cell and a fourth liquid crystal cell stacked over the third liquid crystal cell,
each of the third liquid crystal cell and the fourth liquid crystal cell comprises:
a third substrate on which a fifth transparent electrode and a sixth transparent electrode are arranged in the second direction; and
a fourth substrate on which a seventh transparent electrode and an eighth transparent electrode are arranged in the first direction;
the second substrate of the second liquid crystal cell and the third substrate of the third liquid crystal cell are adjacent to each other, and
the fourth substrate of the third liquid crystal cell and the third substrate of the fourth liquid crystal cell are adjacent to each other.

5. The lighting device according to claim 4, wherein the first direction intersects the second direction at 90±10 degrees, and
the third direction intersects the fourth direction at 90±10 degrees.

6. The lighting device according to claim 5, wherein an angle between the first direction and the third direction is 45±10 degrees.

7. The lighting device according to claim 6, further comprising a lookup table storing potential values for correcting a shape of a light distribution when a potential difference between the first transparent electrode and the second transparent electrode, a potential difference between the third transparent electrode and the fourth transparent electrode, a potential difference between the fifth transparent electrode and the sixth transparent electrode, and a potential difference between the seventh transparent electrode and the eighth transparent electrode are 0 V.

8. The lighting device according to claim 1, further comprising a control unit communicatively connected to an information terminal,
wherein a signal processing part of the control unit controls a brightness of the light emitting module based on a request signal from the information terminal.

9. The lighting device according to claim 1, further comprising a control unit communicatively connected to an information terminal,
wherein a signal processing part of the control unit controls a potential supplied to the optical element based on a request signal from the information terminal.

10. The lighting device according to claim 1, further comprising a control unit communicatively connected to an information terminal,
wherein a signal processing part of the control unit controls a brightness of the light emitting module based on a request signal from the information terminal.

11. A lighting device comprising:
a light emitting module; and
an optical element transmitting light emitted from the light emitting module, in which a first liquid crystal cell and a second liquid crystal cell are stacked,
wherein each of the first liquid crystal cell and the second liquid crystal cell comprises:
a first substrate on which a first transparent electrode and a second transparent electrode are alternately arranged in a first direction; and
a second substrate on which a third transparent electrode and a fourth transparent electrode are alternately arranged in a second direction intersecting the first direction,
the light emitting module comprises:
a light source; and
a reflector arranged around the light source and reflecting light emitted from the light source, and
the second substrate of the first liquid crystal cell and the first substrate of the second liquid crystal cell are adjacent to each other.

12. The lighting device according to claim 11, wherein the optical element comprises a third liquid crystal cell and a fourth liquid crystal cell stacked over the third liquid crystal cell,
each of the third liquid crystal cell and the fourth liquid crystal cell comprises:
a third substrate on which a fifth transparent electrode and a sixth transparent electrode are arranged in the second direction; and
a fourth substrate on which a seventh transparent electrode and an eighth transparent electrode are arranged in the first direction;
the second substrate of the second liquid crystal cell and the third substrate of the third liquid crystal cell are adjacent to each other, and
the fourth substrate of the third liquid crystal cell and the third substrate of the fourth liquid crystal cell are adjacent to each other.

13. The lighting device according to claim 12, wherein the first direction intersects the second direction at 90±10 degrees.

14. The lighting device according to claim 13, further comprising a lookup table storing potential values for correcting a shape of a light distribution when a potential difference between the first transparent electrode and the second transparent electrode, a potential difference between the third transparent electrode and the fourth transparent electrode, a potential difference between the fifth transparent electrode and the sixth transparent electrode, and a potential difference between the seventh transparent electrode and the eighth transparent electrode are 0 V.

15. The lighting device according to claim 11, further comprising a control unit communicatively connected to an information terminal,
wherein a signal processing part of the control unit controls a potential supplied to the optical element based on a request signal from the information terminal.

* * * * *